United States Patent
Nies

(10) Patent No.: US 10,682,705 B2
(45) Date of Patent: Jun. 16, 2020

(54) GEAR ASSEMBLY FOR A WIND TURBINE GEARBOX HAVING A FLEXIBLE PIN SHAFT AND CARRIER

(71) Applicant: General Electric Company, Schenectady, NY (US)

(72) Inventor: Jacob Johannes Nies, Hertme (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/431,920

(22) Filed: Jun. 5, 2019

(65) Prior Publication Data
US 2019/0321892 A1    Oct. 24, 2019

Related U.S. Application Data

(63) Continuation-in-part of application No. 15/807,761, filed on Nov. 9, 2017, now Pat. No. 10,330,174.

(51) Int. Cl.
| | | |
|---|---|---|
| *F16H 1/28* | (2006.01) |
| *B22F 5/08* | (2006.01) |
| *F03D 15/00* | (2016.01) |
| *F16H 57/04* | (2010.01) |
| *B33Y 80/00* | (2015.01) |
| *B33Y 10/00* | (2015.01) |

(52) U.S. Cl.
CPC ............ *B22F 5/08* (2013.01); *F03D 15/00* (2016.05); *F16H 1/28* (2013.01); *F16H 57/042* (2013.01); *F16H 57/0412* (2013.01); *F16H 57/0479* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 2,688,263 A * | 9/1954 | Rockwell | F16H 1/28 |
| | | | 475/338 |
| 3,154,970 A | 11/1964 | Gebhardt et al. | |
| 3,303,713 A | 2/1967 | Hicks | |
| 3,352,178 A | 11/1967 | Lindgren et al. | |
| 3,943,787 A | 3/1976 | Hicks | |
| 4,104,933 A * | 8/1978 | Campbell | B60K 17/046 |
| | | | 184/6.12 |
| 6,422,970 B1 | 7/2002 | Paroli | |
| 6,883,235 B2 | 4/2005 | Bell | |
| 8,147,145 B2 | 4/2012 | Inoue et al. | |

(Continued)

FOREIGN PATENT DOCUMENTS

| | | | |
|---|---|---|---|
| CA | 2679726 A1 | 11/2009 | |
| GB | 274396 A * | 7/1927 | F16H 1/28 |

(Continued)

*Primary Examiner* — Justin Holmes
(74) *Attorney, Agent, or Firm* — Dority & Manning, P.A.

(57) ABSTRACT

A carrier and at least one pin shaft of a gearbox of a wind turbine and method of manufacturing same includes forming the carrier and the pin shaft(s) as a single part or separate components. Further, the method includes forming one or more voids in the pin shaft(s) and/or the carrier via additive manufacturing. As such, the void(s) is configured to increase flexibility of the pin shaft(s)/carrier so as to improve a load distribution thereof.

20 Claims, 17 Drawing Sheets

(56) References Cited

U.S. PATENT DOCUMENTS

| | | |
|---|---|---|
| 8,235,861 B2 | 8/2012 | Lopez et al. |
| 8,376,902 B2 | 2/2013 | Fox et al. |
| 8,430,788 B2 | 4/2013 | Fox et al. |
| 8,672,797 B2 | 3/2014 | Fox |
| 8,690,539 B2 | 4/2014 | Hohle et al. |
| 8,702,558 B2 | 4/2014 | Smook |
| 8,758,190 B2 | 6/2014 | Montestrue |
| 8,920,284 B2 | 12/2014 | Fox |
| 8,961,362 B2 | 2/2015 | Fox et al. |
| 9,103,413 B2 | 8/2015 | Curti et al. |
| 9,713,843 B2 | 7/2017 | Snyder et al. |
| 2003/0008748 A1 | 1/2003 | Fox |
| 2008/0194378 A1 | 8/2008 | Fox |
| 2010/0197444 A1 | 8/2010 | Montestruc |
| 2011/0171026 A1 | 7/2011 | Kolpin et al. |
| 2012/0028755 A1 | 2/2012 | Erno et al. |
| 2012/0184404 A1 | 7/2012 | Chobot et al. |
| 2013/0337967 A1 | 12/2013 | Kleine-Brockhoff et al. |
| 2014/0141930 A1 | 5/2014 | Gerke et al. |
| 2016/0023272 A1 | 1/2016 | Mongillo |
| 2016/0298751 A1 | 10/2016 | McCune |
| 2018/0195559 A1* | 7/2018 | Hallman ............... F16C 35/063 |
| 2018/0241289 A1 | 8/2018 | Desbiens et al. |
| 2019/0136945 A1 | 5/2019 | Nies et al. |

FOREIGN PATENT DOCUMENTS

| | | |
|---|---|---|
| IN | 201000506 I2 | 9/2016 |
| JP | 2008196702 A | 8/2008 |
| WO | WO2009/102853 A1 | 8/2009 |
| WO | WO2009/134684 A1 | 11/2009 |

* cited by examiner

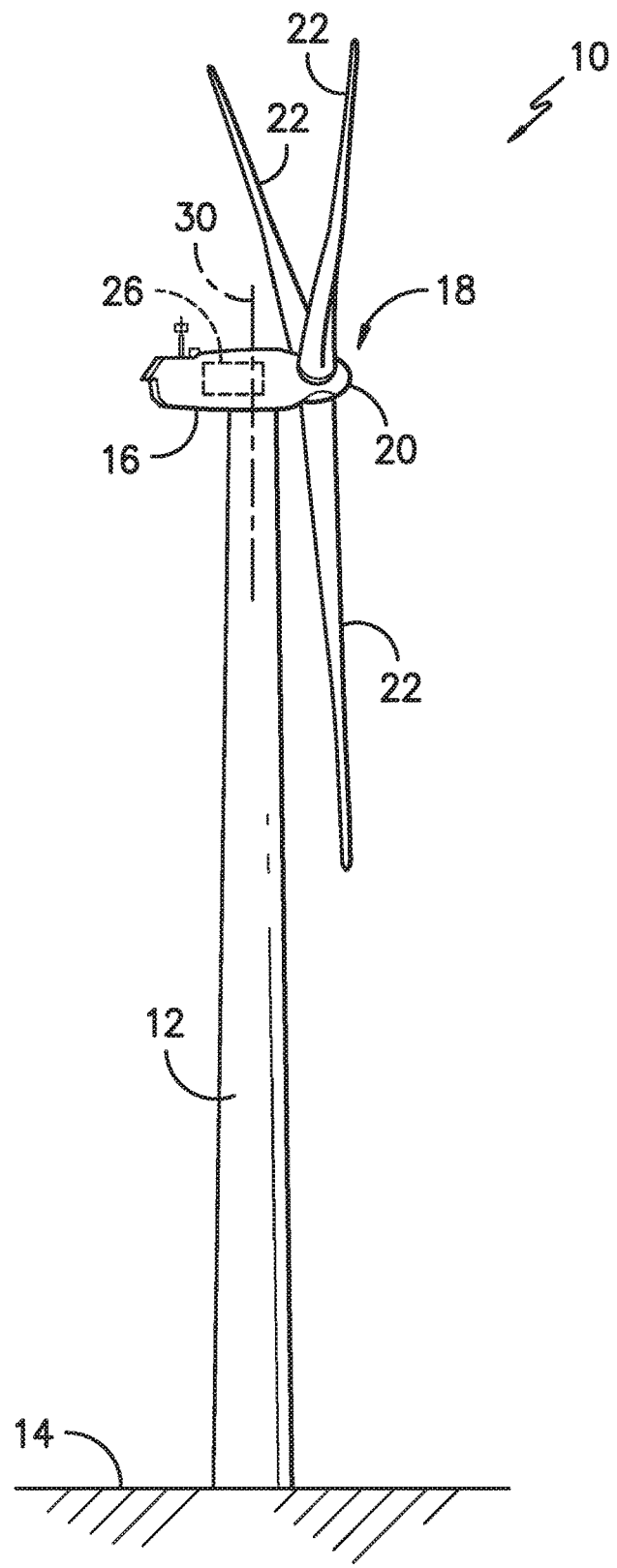
FIG. -1-
(PRIOR ART)

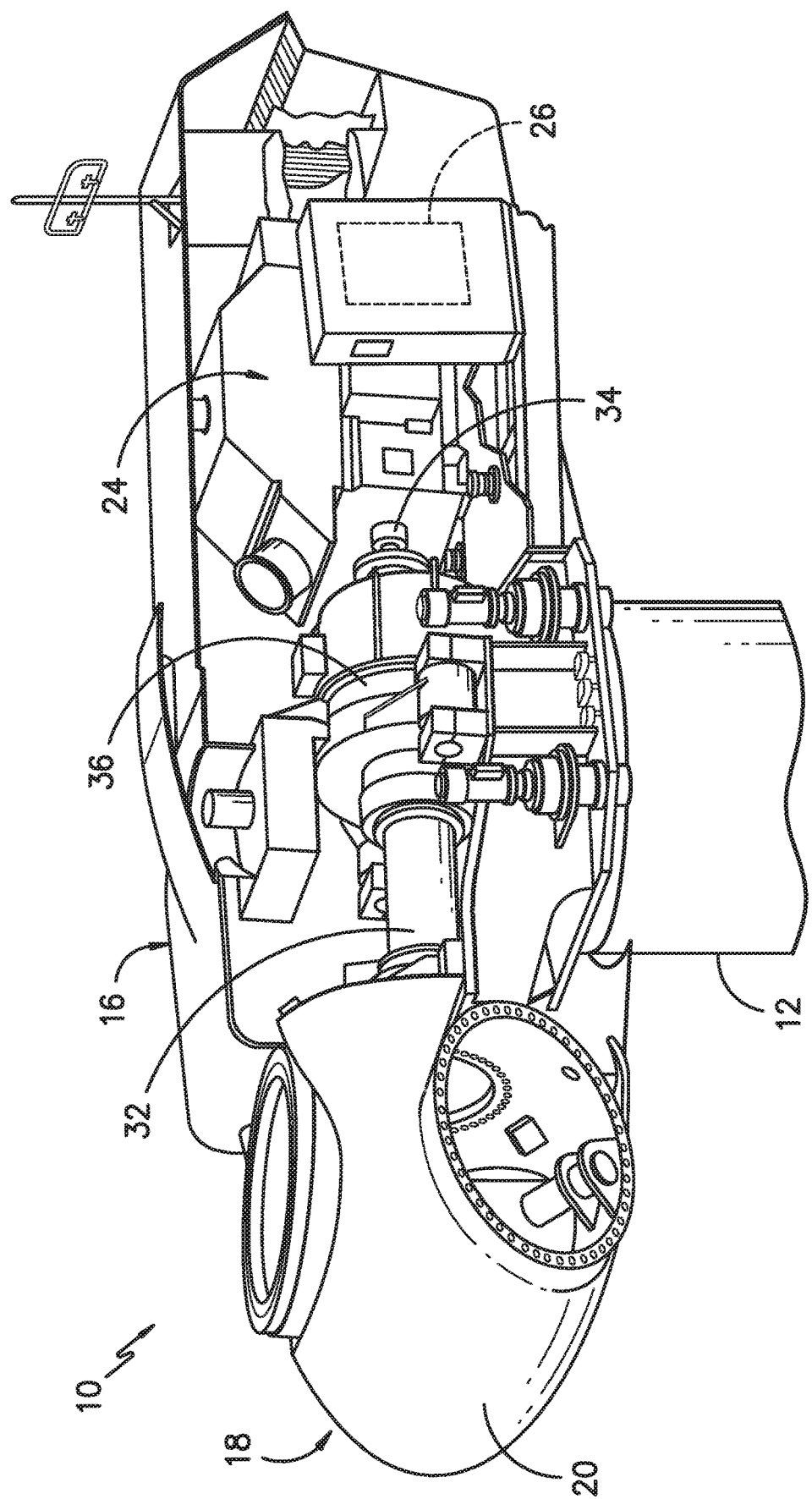
FIG. -2-
(PRIOR ART)

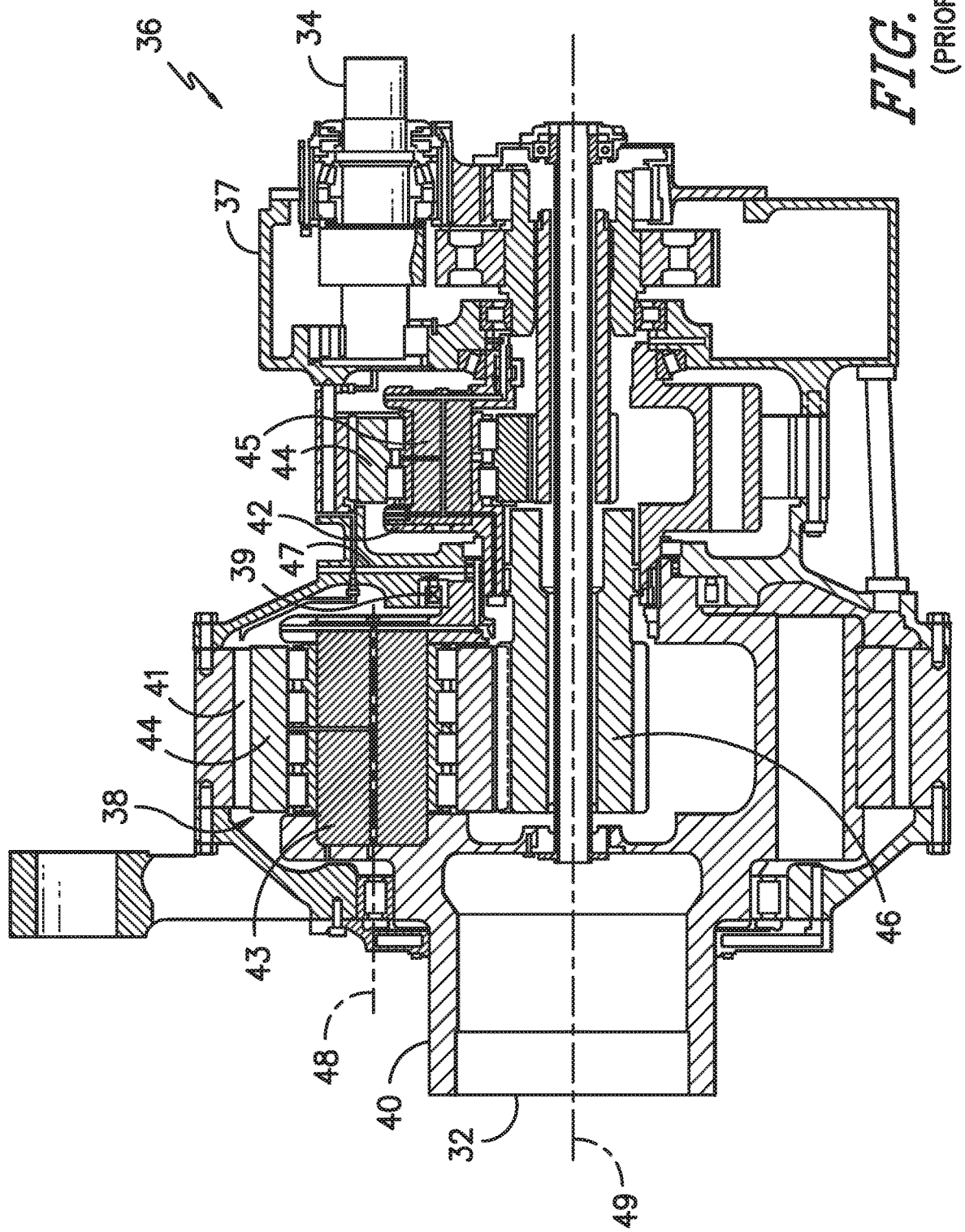
FIG. -3-
(PRIOR ART)

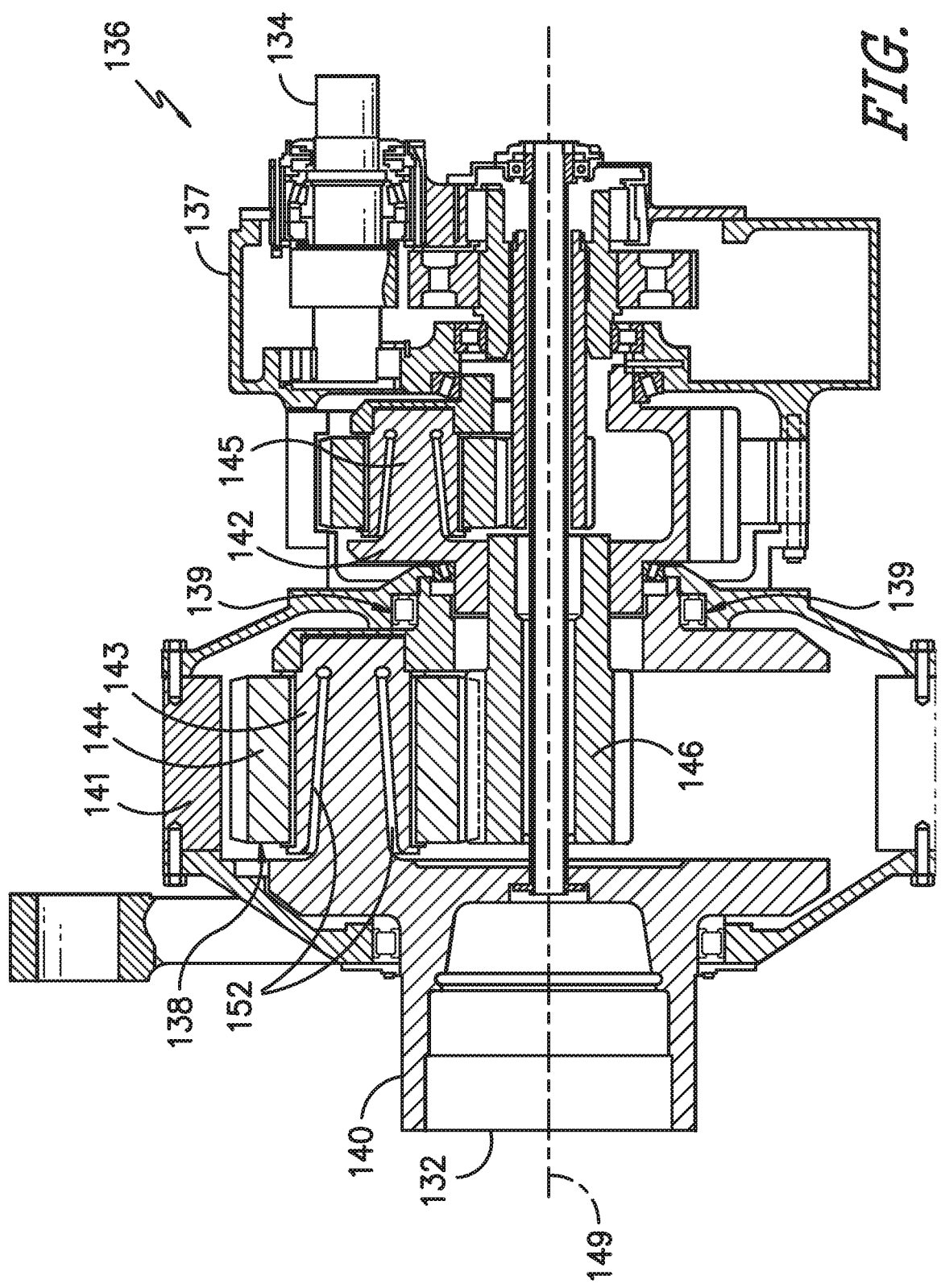

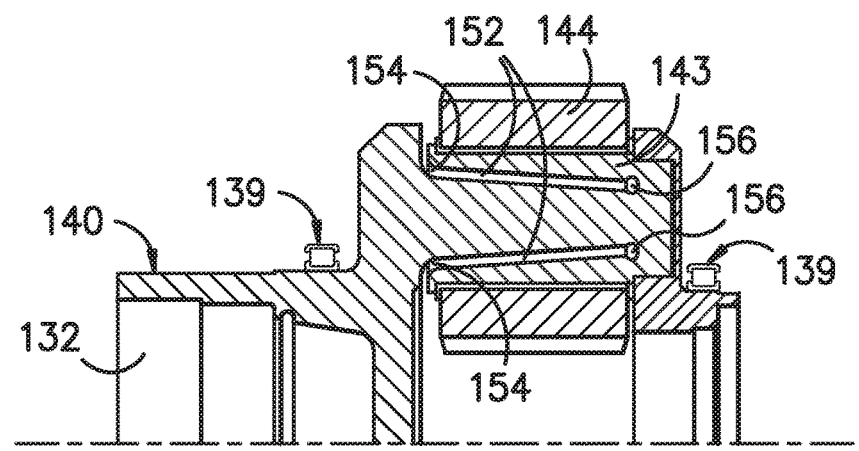
FIG. -5-
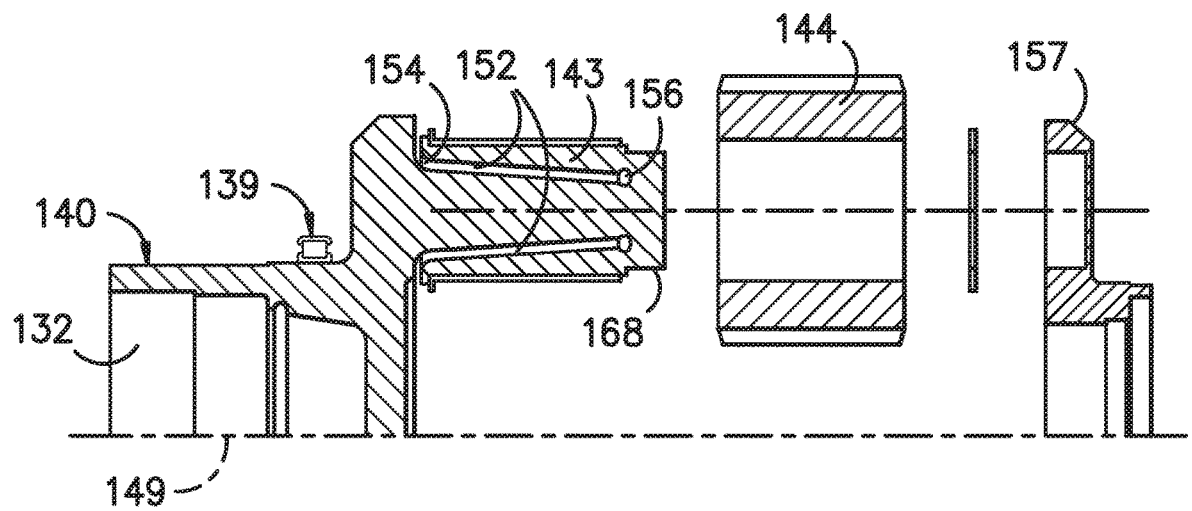
FIG. -6-

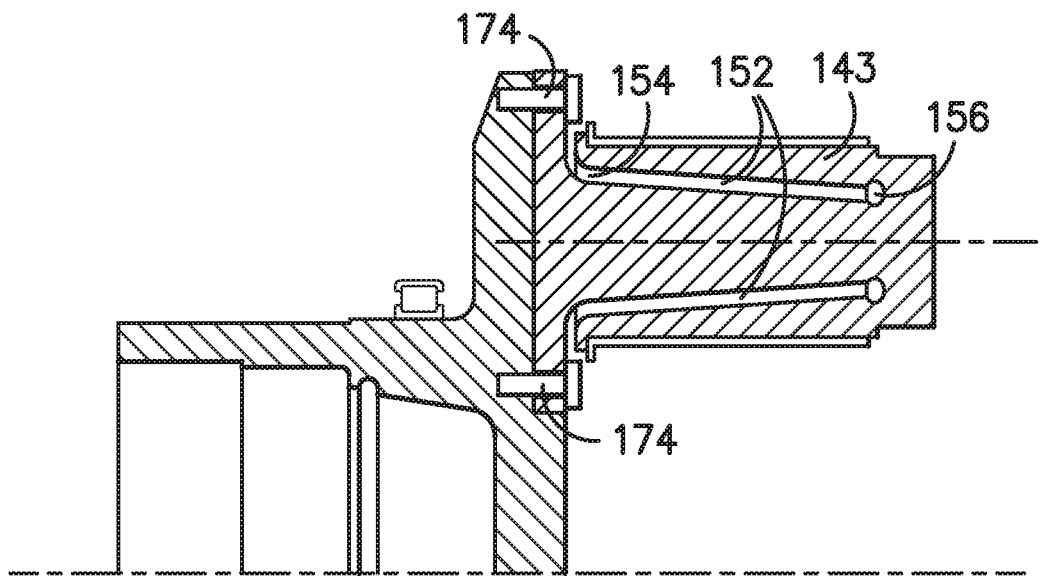
FIG. -7-
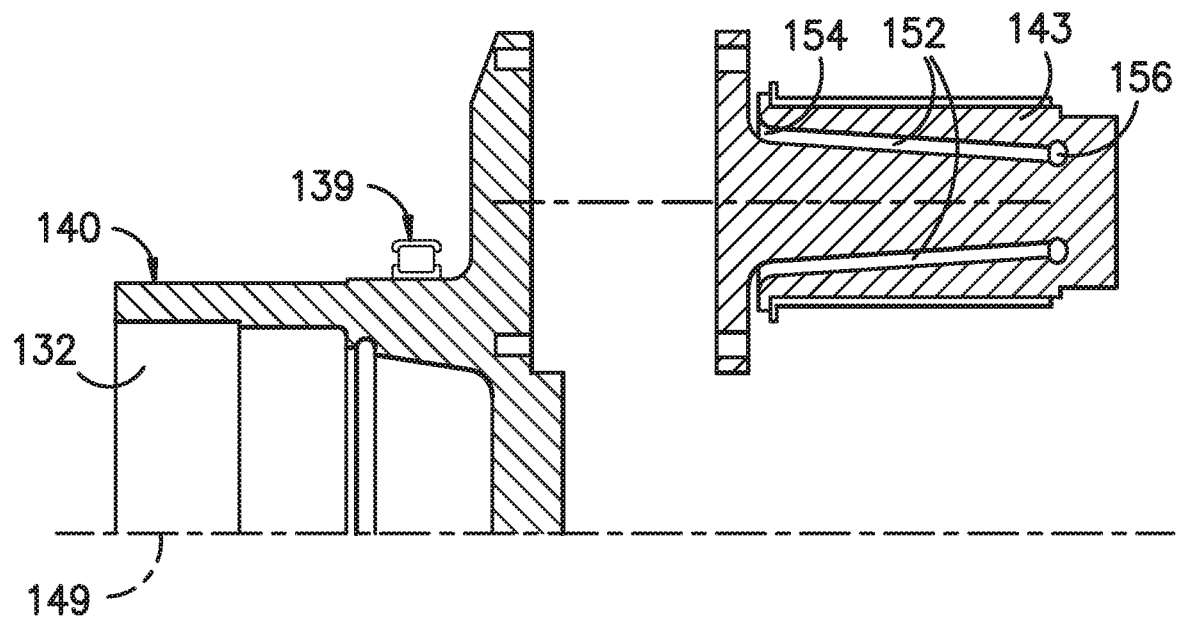
FIG. -8-

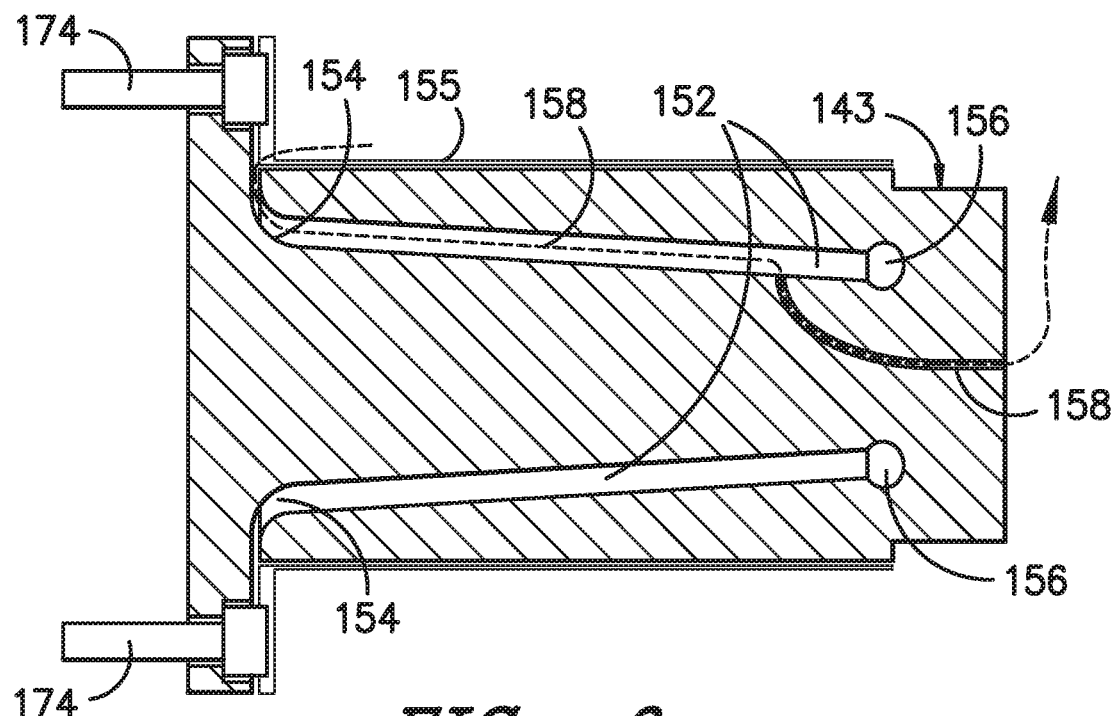
FIG. -9-
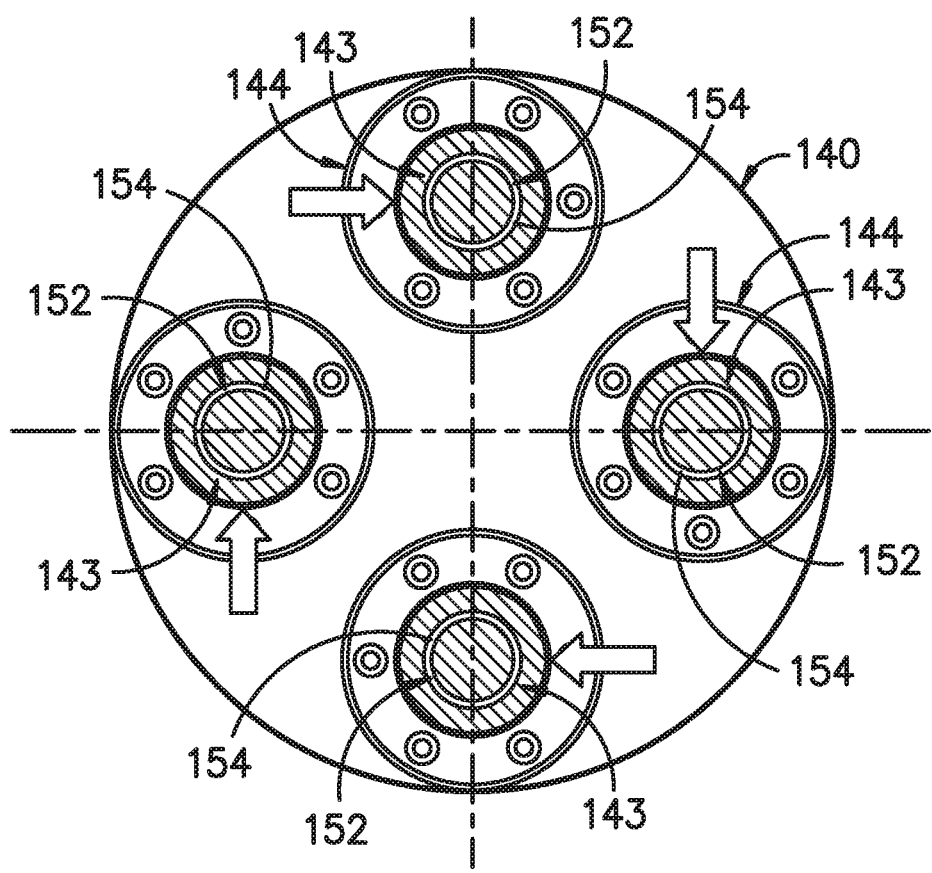
FIG. -10-

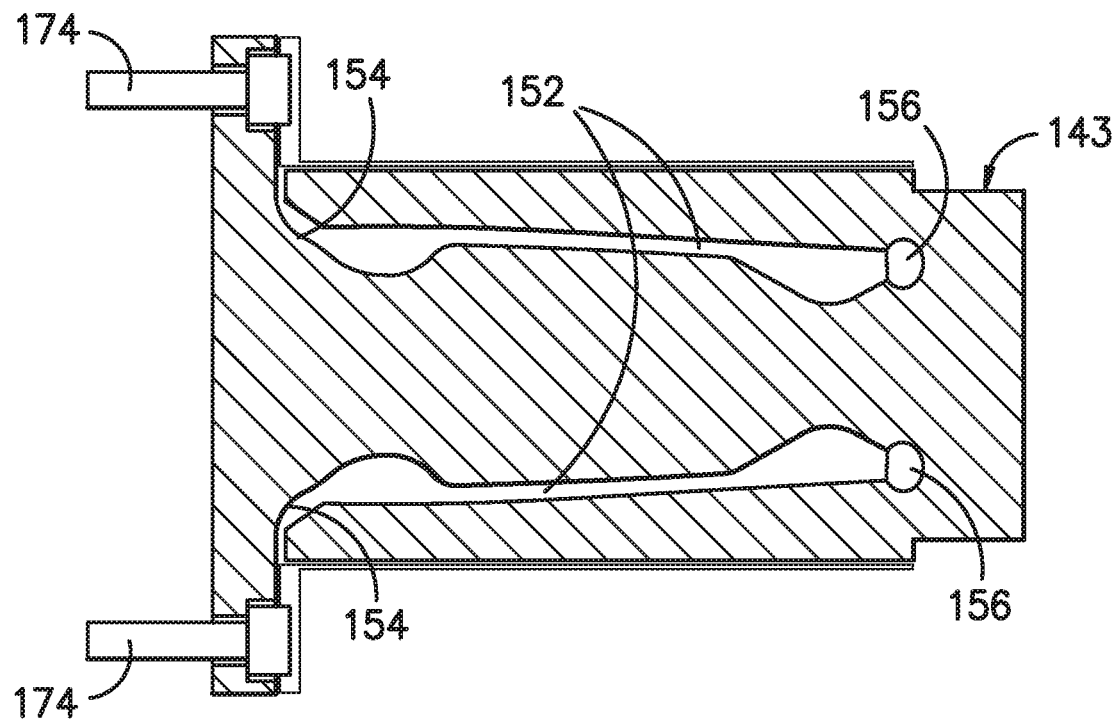
FIG. -11-
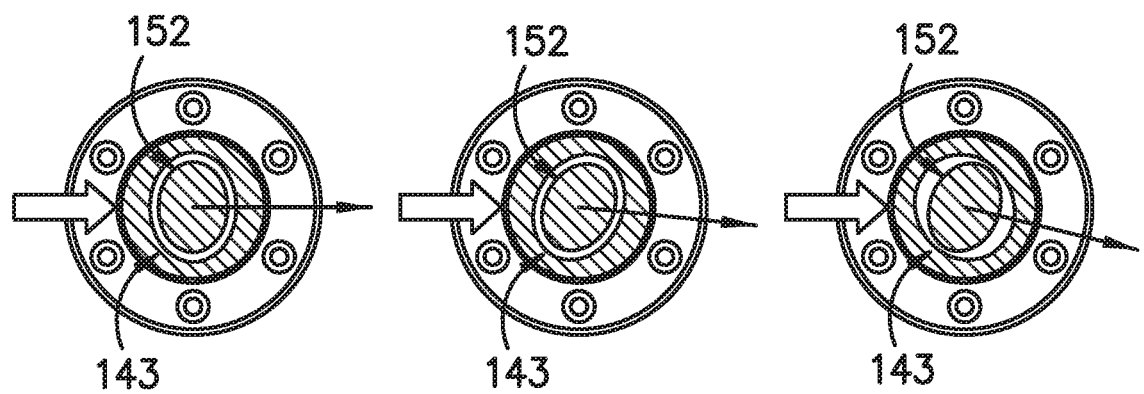
FIG. -12-

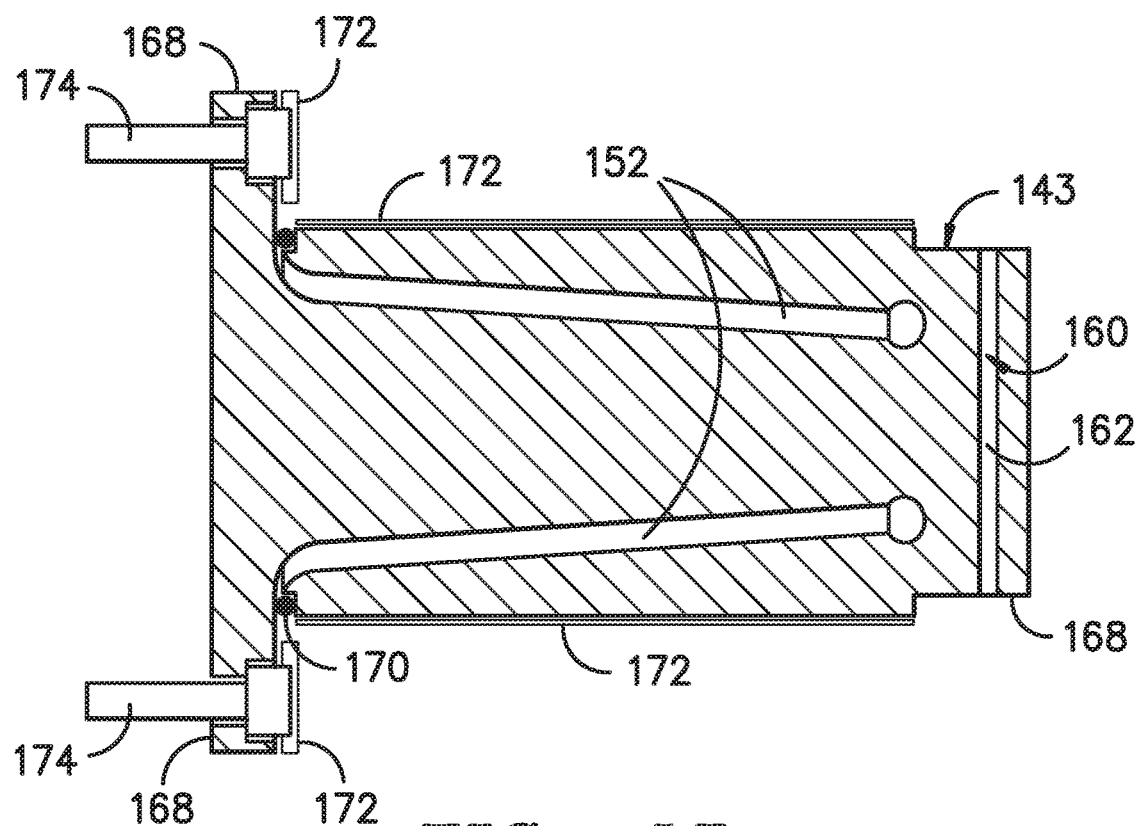
FIG. -13-
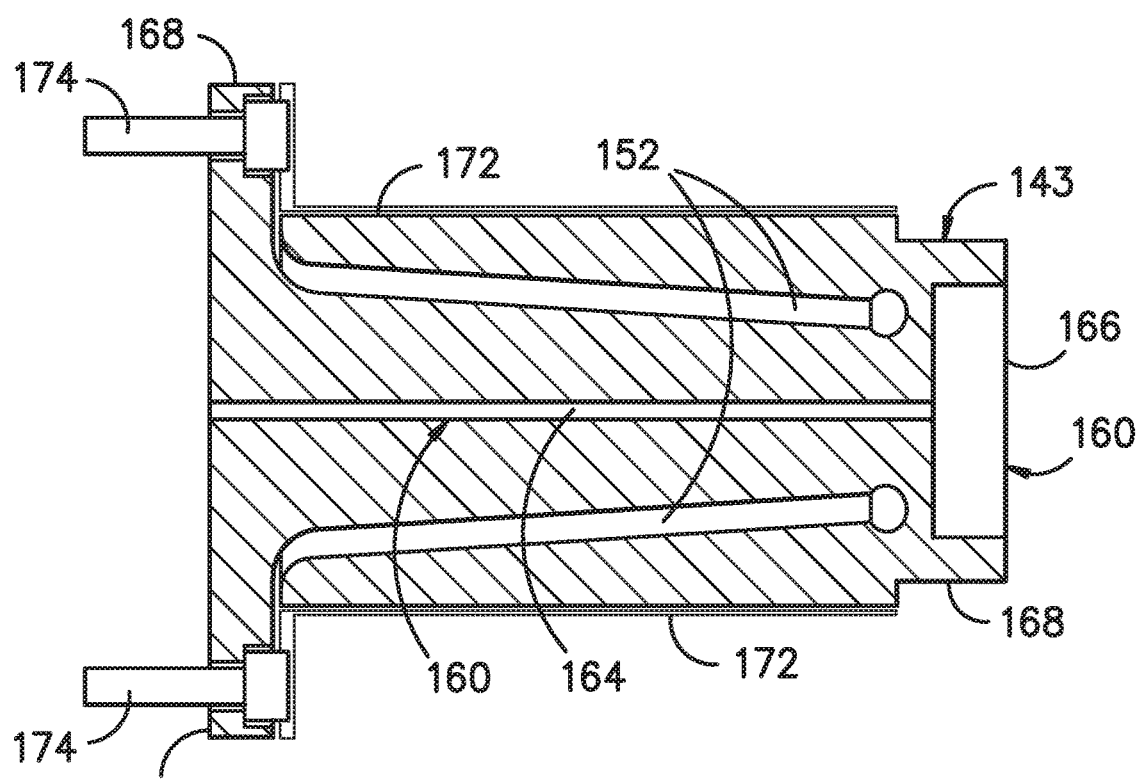
FIG. -14-

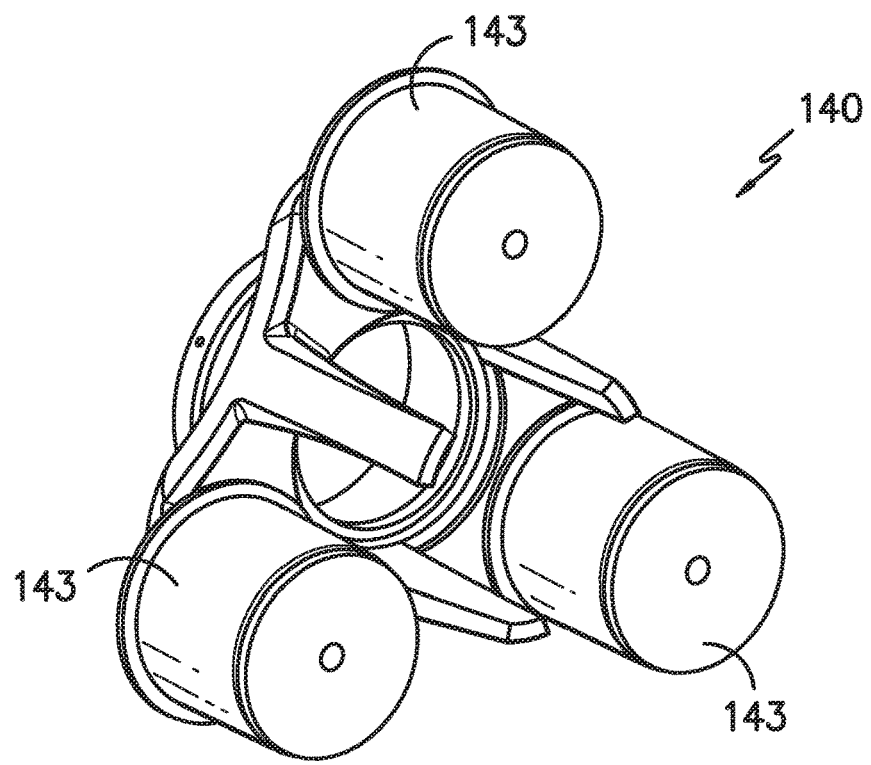
FIG. -15-
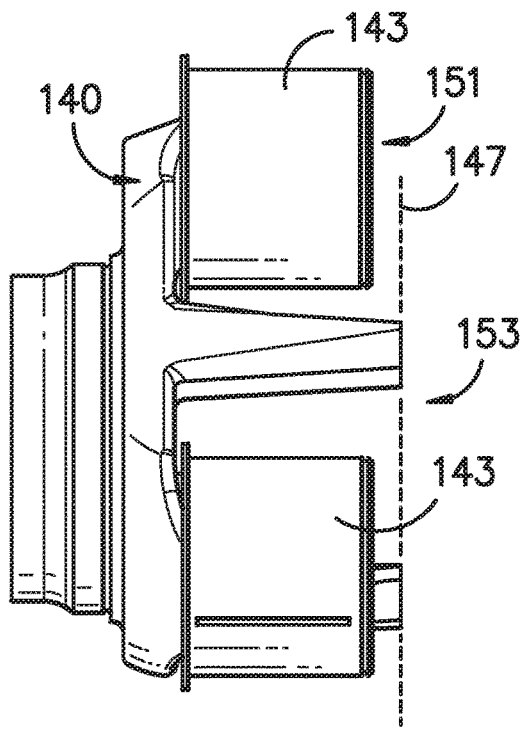
FIG. -16-

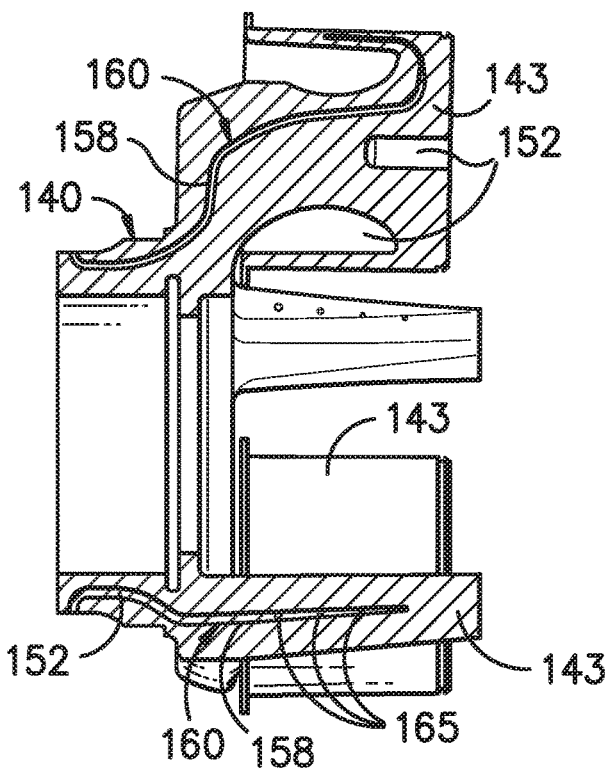
FIG. -17-
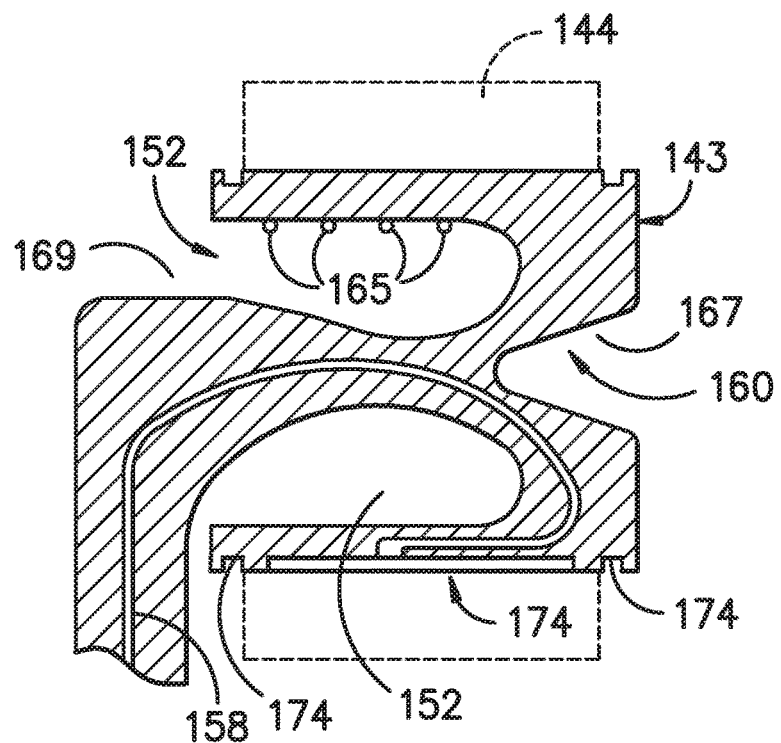
FIG. -18-

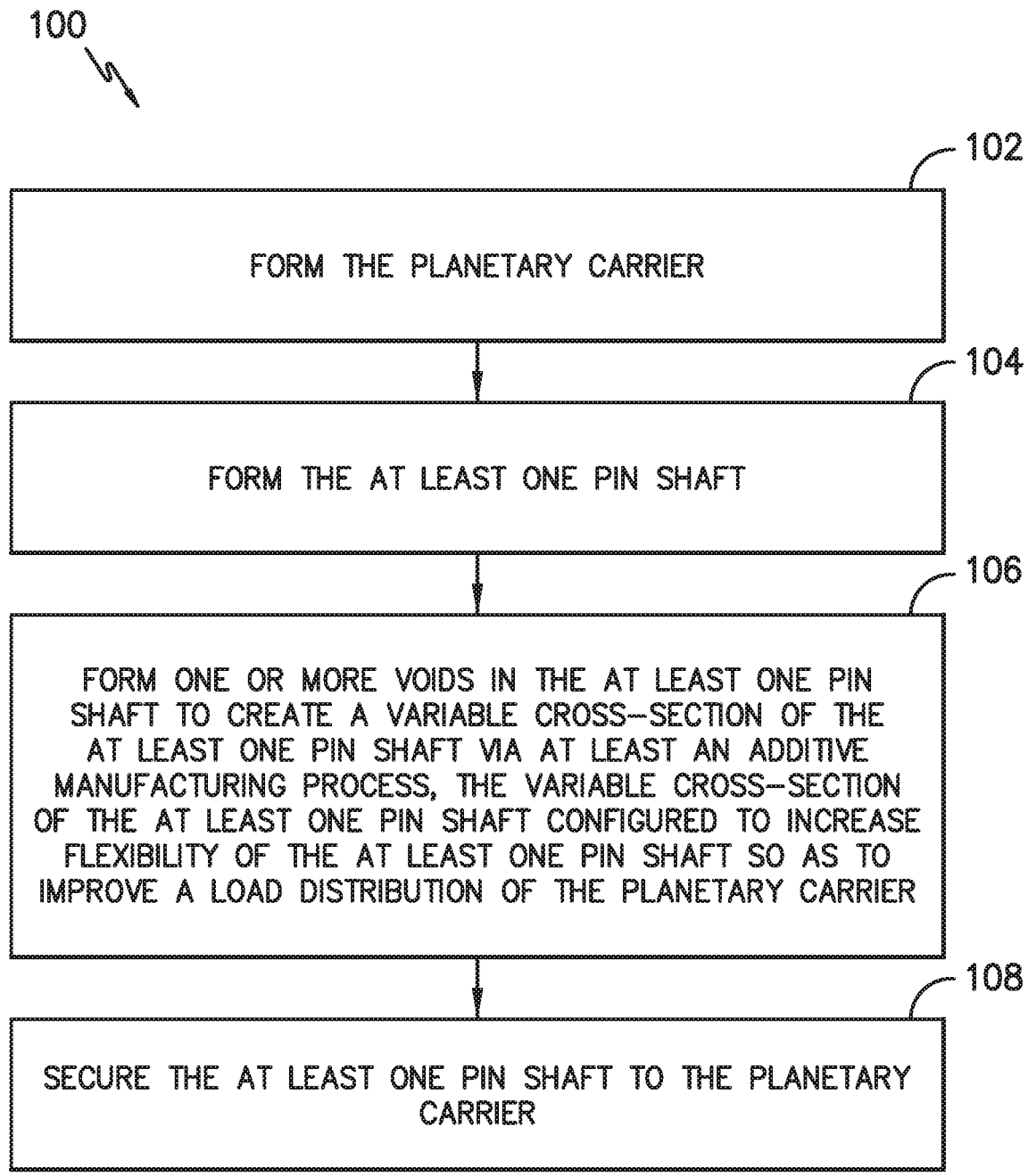
FIG. -19-

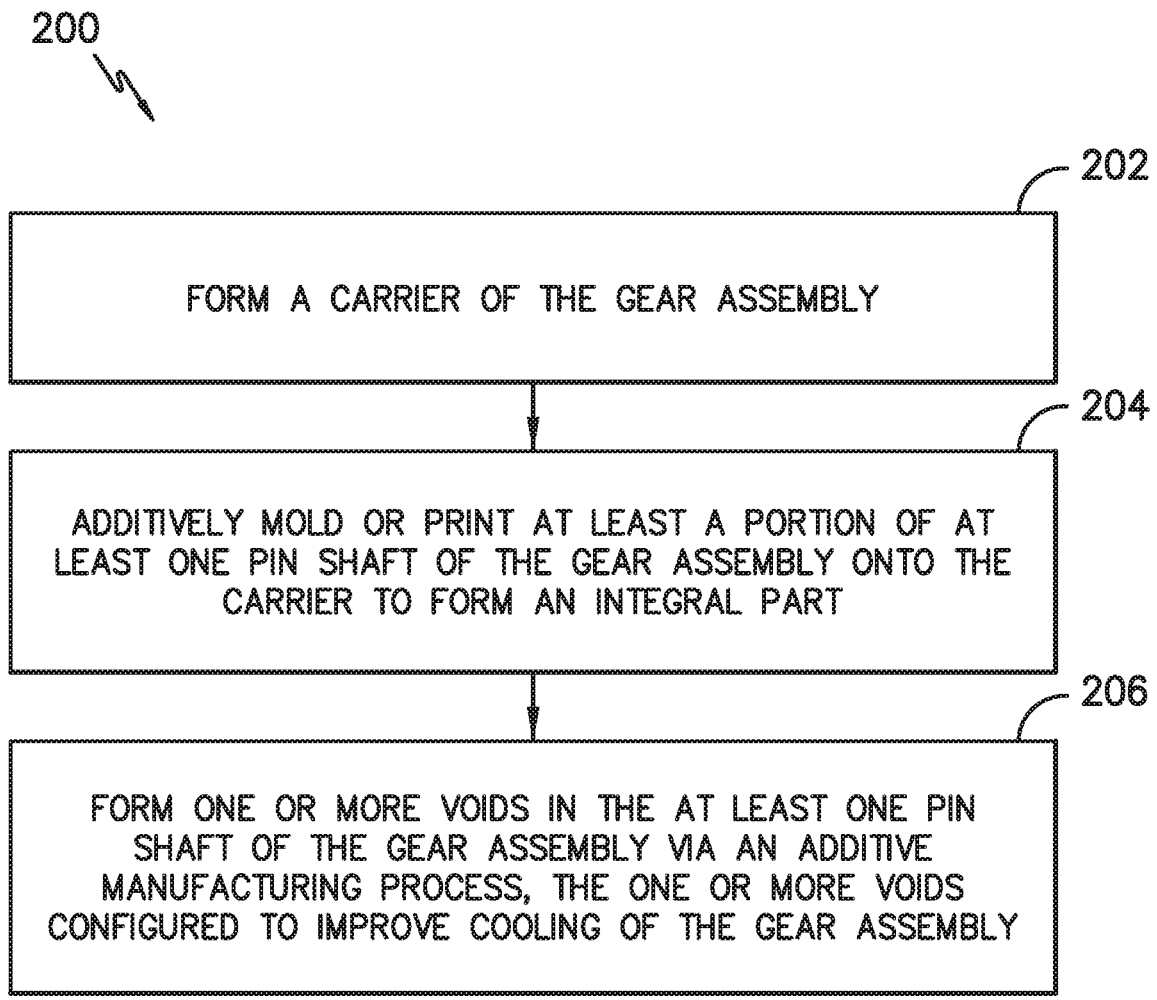
FIG. -20-

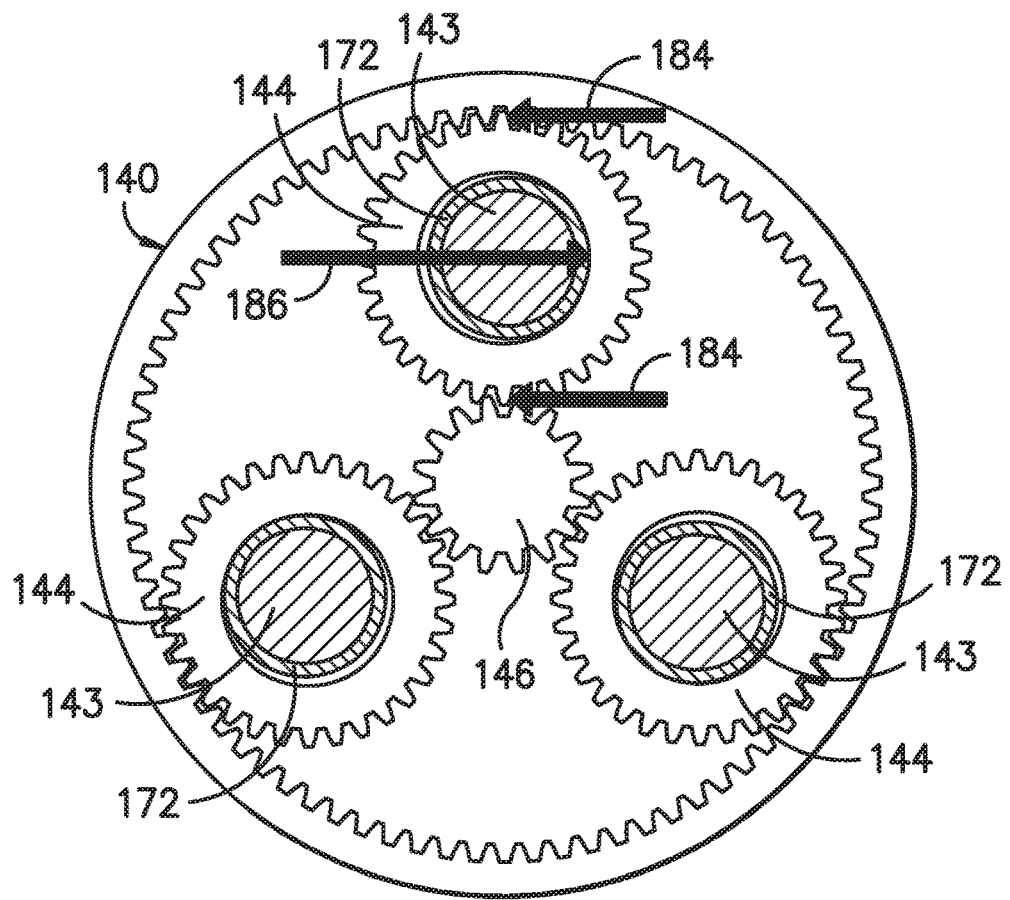
FIG. -21-
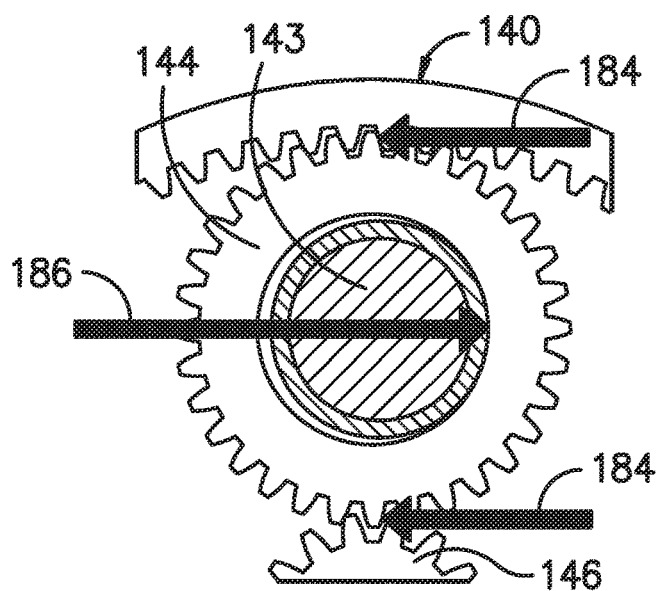
FIG. -22-

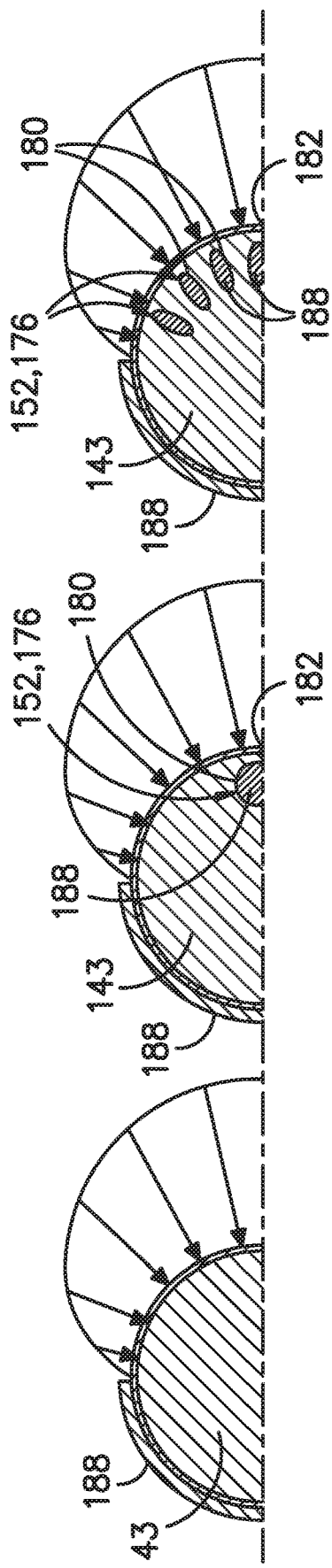

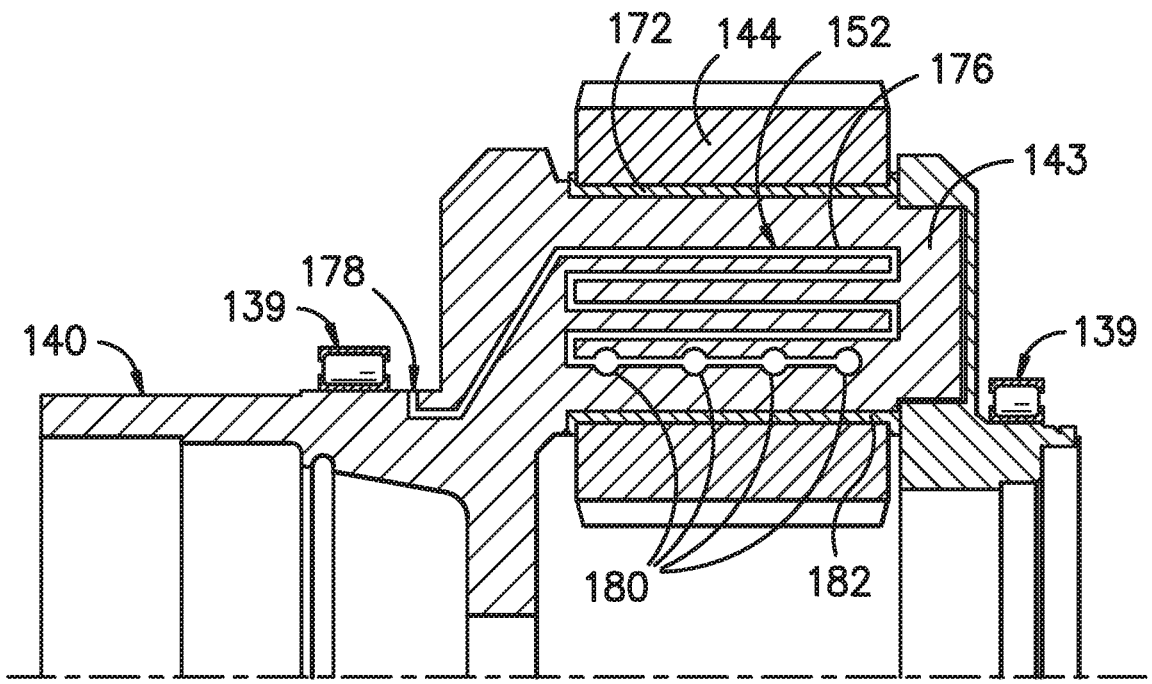
FIG. -24-
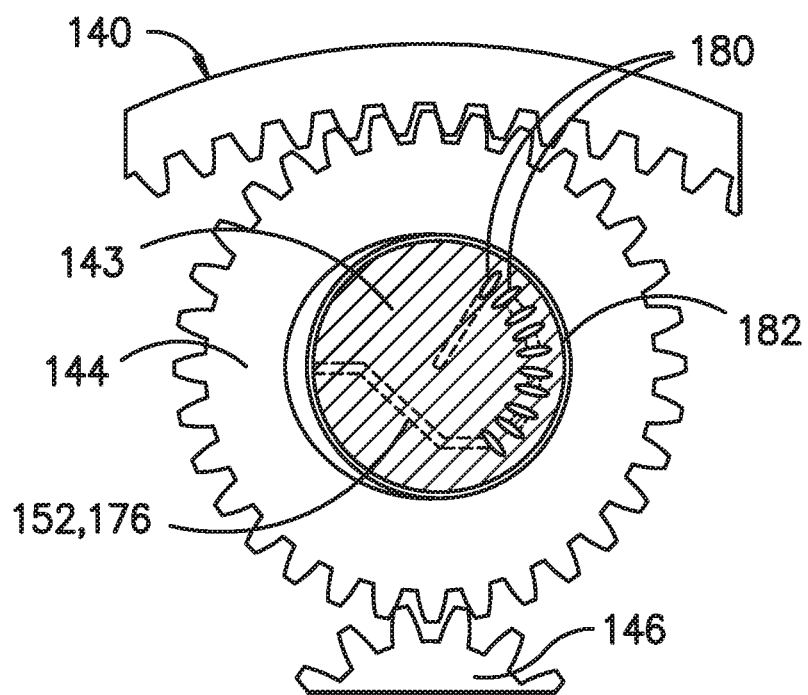
FIG. -25-

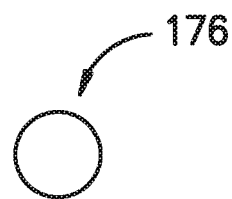
FIG. -26A-
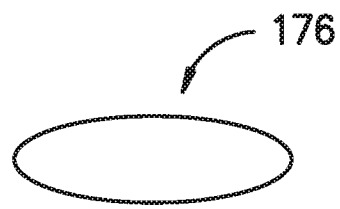
FIG. -26B-
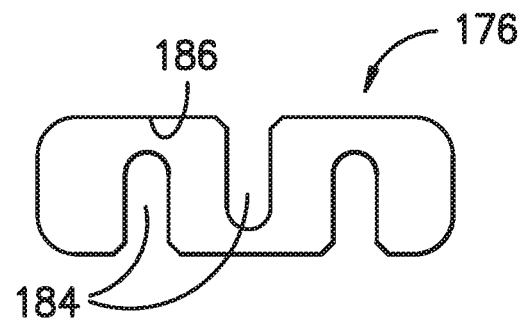
FIG. -26C-
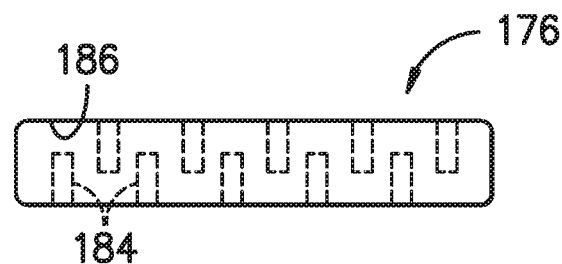
FIG. -26D-

GEAR ASSEMBLY FOR A WIND TURBINE GEARBOX HAVING A FLEXIBLE PIN SHAFT AND CARRIER

RELATED APPLICATIONS

The present invention claims priority to U.S. application Ser. No. 15/807,761 filed on Nov. 9, 2017, which is incorporated herein by reference in its entirety.

FIELD

The present disclosure relates in general to wind turbines, and more particularly to a gear assembly for a wind turbine gearbox having a flexible pin shaft with improved cooling made, at least in part, via additive manufacturing.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

The gearbox generally includes a gearbox housing containing a plurality of gears (e.g., planetary, ring and/or sun gears as well as non-planetary gears) connected via one or more planetary carriers and bearings for converting the low speed, high torque input of the rotor shaft to a high speed, low torque output for the generator. In addition, each of the gears rotates about a pin shaft arranged within the one or more planetary carriers. Lubrication systems are often used within the gearbox to circulate oil therethrough, thereby decreasing the friction between the components of the gearbox as well as providing cooling for such components. In addition, the oil is configured to provide corrosion protection while also flushing debris from the lubricated surfaces.

Deformation of many of the gearbox components results in a non-ideal load distribution between the gears. Though all loaded components deform under load, deformation of interfaces between the components is more difficult to predict. The pin shafts of the gearbox therefore often require extensive machining. More particularly, the pin-end connections of the pin shafts, which are loaded in bending, can be problematic by design. Thus, such gearbox components can experience an uneven load distribution.

Accordingly, an improved gearbox assembly for a wind turbine that addresses the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for manufacturing a gear assembly of a gearbox of a wind turbine. The method includes forming a carrier of the gear assembly and at least one pin shaft of the gear assembly as a single part. Further, the pin shaft(s) has a variable cross-section. The method also includes forming one or more voids in the gear assembly via an additive manufacturing process. As such, the void(s) are configured to increase flexibility of the pin shaft(s) so as to improve a load distribution of the carrier.

In one embodiment, the additive manufacturing process may include binder jetting, material jetting, laser cladding, cold spray deposition, directed energy deposition, powder bed fusion, material extrusion, vat photopolymerisation, or any other suitable additive manufacturing process.

In another embodiment, the method may include forming at least one additional feature into the pin shaft(s) via additive manufacturing. More specifically, in certain embodiments, the additional feature(s) may include an oil path, one or more ribs or structural supports on and interior surface of one or more of the voids, a cooling channel, an inspection path, a void removal feature, a signal wiring path, a sensor recess, or a locating feature, or any other features that can be easily printed or formed therein.

In further embodiments, the method may include forming the carrier and the pin shaft(s) as the single part via additive manufacturing.

In alternative embodiments, the step of forming the carrier and the pin shaft(s) may include casting the carrier and the pin shaft(s) as a single part. In such embodiments, the step of casting the carrier and the pin shaft(s) may include pouring a liquid material into a mold of the carrier and the pin shaft(s) and allowing the liquid material to solidify in the mold so as to form the carrier and the pin shaft(s) as the single part. Alternatively, the step of casting the carrier and the pin shaft(s) may include pouring a liquid material into a mold of the carrier, allowing the liquid material to solidify in the mold so as to form the carrier, and then additively molding or printing the pin shaft(s) to the cast carrier to form the integral part.

In additional embodiments, the method may include splitting the carrier into a main portion and a secondary portion after forming the carrier and the at least one pin shaft as the single part, the main portion comprising the at least one pin shaft so as to assist with assembly of the gears onto the pin shaft(s). As such, after splitting, the method may include removing the secondary portion of the carrier from the main portion and assembling a gear onto the pin shaft(s) of the main portion. The method then includes replacing the secondary portion onto the main portion.

In several embodiments, the method may include determining a geometry and location for the one or more voids based on a load path of the carrier. For example, in one embodiment, the method may include forming the one or more voids in the pin shaft(s) in a lengthwise center location thereof so as to load the gears as evenly as possible.

In particular embodiments, the method may also include depositing, e.g. printing, bearing material onto an exterior surface of the pin shaft(s).

In another aspect, the present disclosure is directed to a method for manufacturing a gear assembly of a gearbox of a wind turbine. The method includes forming a carrier of the gear assembly. The method also includes forming at least one pin shaft of the gear assembly having a variable cross-section. Further, the method includes forming one or more voids in the gear assembly via an additive manufacturing process. Moreover, the void(s) are configured to increase flexibility of the pin shaft(s) so as to improve a load distribution of the carrier. In addition, the method includes securing the pin shaft(s) to the carrier.

It should also be understood that the method may further include any of the additional features and/or steps described herein.

In addition, the step of forming the carrier and forming the pin shaft(s) may include casting the carrier and casting the pin shaft(s) as separate parts. Thus, in certain embodiments, the method may include securing the pin shaft(s) to the carrier via one or more fasteners.

In further embodiments, the method may include depositing bearing material onto an exterior surface of the pin shaft(s) and covering the one or more fasteners with the deposited bearing material.

In yet another aspect, the present disclosure is directed to a gearbox assembly. The gearbox assembly includes a gearbox housing and a planetary gear system configured therein. The planetary gear system includes a plurality of planet gears, at least one sun gear, at least one ring gear, at least one carrier operatively coupled with the plurality of planet gears, and a plurality of pin shafts. Each of the planet gears is arranged so as to rotate around one of the plurality of pin shafts. Further, each of the planet gears is engaged with the ring gear and configured to rotate about the sun gear. Further, the pin shaft(s) is integral with the carrier. Moreover, the pin shaft(s) includes a variable cross-section containing one or more voids formed therein. As such, the variable cross-section of the pin shaft(s) is configured to increase flexibility of the pin shaft(s) so as to improve a load distribution of the carrier.

It should also be understood that the gearbox assembly may further include any of the additional features described herein.

In addition, the gearbox assembly may include at least one seal arranged on an exterior surface of the pin shaft(s) so as to seal the one or more voids, which may prevent swarf from entering the void(s) while machining. In addition, the seal(s) may also be arranged to guide the oil supply or the oil draining.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to conventional construction;

FIG. 2 illustrates a detailed, internal view of one embodiment of a nacelle of a wind turbine according to conventional construction;

FIG. 3 illustrates a cross-sectional view of one embodiment of a gearbox assembly of a wind turbine according to conventional construction;

FIG. 4 illustrates a cross-sectional view of one embodiment of a gearbox assembly of a wind turbine according to the present disclosure;

FIG. 5 illustrates a detailed, cross-sectional view of one embodiment of an integral planetary carrier and flexible pin shaft of the gearbox assembly assembled with the planet gear according to the present disclosure;

FIG. 6 illustrates a detailed, cross-sectional view of one embodiment of an integral planetary carrier and flexible pin shaft of the gearbox assembly disassembled from the planet gear according to the present disclosure;

FIG. 7 illustrates a detailed, cross-sectional view of one embodiment of a planetary carrier and a separate flexible pin shaft of the gearbox assembly according to the present disclosure, particularly illustrating the pin shaft mounted to the planetary carrier;

FIG. 8 illustrates a detailed, cross-sectional view of one embodiment of a planetary carrier and a separate flexible pin shaft of the gearbox assembly according to the present disclosure, particularly illustrating the pin shaft dismounted from the planetary carrier; and, FIG. 9 illustrates a detailed, cross-sectional view of one embodiment of a separate flexible pin shaft of the gearbox assembly according to the present disclosure, particularly illustrating an oil path formed therein;

FIG. 10 illustrates a front view of one embodiment of an integral planetary carrier and a plurality of flexible pin shafts of the gearbox assembly according to the present disclosure;

FIG. 11 illustrates a detailed, cross-sectional view of one embodiment of a separate flexible pin shaft of the gearbox assembly according to the present disclosure, particularly illustrating a non-conical void formed therein;

FIG. 12 illustrates detailed, front views of a plurality of flexible pin shafts of the gearbox assembly according to the present disclosure, particularly illustrating different shapes of voids formed in the pin shafts;

FIG. 13 illustrates a detailed, cross-sectional view of one embodiment of a separate flexible pin shaft of the gearbox assembly according to the present disclosure, particularly illustrating various additional features formed therein;

FIG. 14 illustrates a detailed, cross-sectional view of one embodiment of a separate flexible pin shaft of the gearbox assembly according to the present disclosure, particularly illustrating a sensor wire path and sensor recess formed therein;

FIG. 15 illustrates a perspective view of one embodiment of a planetary carrier and a plurality of integral pin shafts of a gearbox assembly according to the present disclosure;

FIG. 16 illustrates a side view of the planetary carrier and the plurality of integral pin shafts of the gearbox assembly of FIG. 15;

FIG. 17 illustrates a cross-sectional view of the planetary carrier and the plurality of integral pin shafts of the gearbox assembly of FIG. 16;

FIG. 18 illustrates a detailed, cross-sectional view of another embodiment of a flexible pin shaft of the gearbox assembly according to the present disclosure, particularly illustrating various additional features formed therein; and FIG. 19 illustrates a flow diagram of one embodiment of a method for manufacturing a gear assembly of a gearbox of a wind turbine according to the present disclosure;

FIG. 20 illustrates a flow diagram of another embodiment of a method for manufacturing a gear assembly of a gearbox of a wind turbine according to the present disclosure;

FIG. 21 illustrates a cross-sectional view of one embodiment of a gear assembly of a gearbox of a wind turbine according to the present disclosure, particularly illustrating a load path of the gear assembly during operation;

FIG. 22 illustrates a detailed, cross-sectional view of a portion of the gear assembly of FIG. 21;

FIGS. 23A-23C illustrate cross-sectional views of multiple embodiments of a pin shaft formed via additive manufacturing according to the present disclosure;

FIG. 24 illustrates a detailed, cross-sectional view of another embodiment of a pin shaft of the gear assembly according to the present disclosure, particularly illustrating a oil path formed therein;

FIG. 25 illustrates a detailed, cross-sectional view of another embodiment of a gear assembly of a gearbox of a wind turbine according to the present disclosure, particularly illustrating an oil path formed into the pin shaft of the gear assembly with the oil path having an elliptical cross-sectional shape; and FIGS. 26A-26D illustrate various views of multiple embodiments of a pin shaft formed via additive manufacturing according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a gear assembly having at least one flexible pin shaft and/or carrier and methods and manufacturing same. It should be understood that the pin shafts described herein are meant to encompass any pin shafts within the gearbox, including pin shafts at planetary stages as well as non-planetary stages (e.g. helical stages). In one embodiment, the carrier and pin shaft(s) may be formed as an integral or single part. Alternatively, the carrier and pin shaft(s) may be formed as separate components. In addition, the carrier and pin shaft(s) may be formed via casting, additive manufacturing, or combinations thereof. More specifically, the flexible pin shaft(s) has a variable cross-section that includes one or more voids formed via additive manufacturing. Further, the void(s) may also be formed into the carrier, e.g. adjacent to the pin shaft(s). As such, the void(s) are configured to increase flexibility thereof so as to improve a load distribution of the carrier.

Thus, the present disclosure provides many advantages not present in the prior art. For example, the integral carrier/flexible pin shaft avoids interfaces between parts, thereby avoiding machining cost and/or bolting of the interfaces, handling of the extra parts, as well as the failure modes of the interfaces or variance in the behavior of the interface due to manufacturing tolerances allowed. Alternatively, the present disclosure may keep the carrier separate from flexible pin shaft, in which case the pin shaft can be formed via additive manufacturing and the carrier may be formed via a more simplistic manufacturing process, such as casting, to take advantage of the different advantages of both techniques. In either case, the flexible pin shaft(s) provide a more even load distribution than pin shafts having a constant or uniform cross-section.

Referring now to the drawings, FIG. 1 illustrates a perspective view of one embodiment of a wind turbine 10 of conventional construction. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. For example, as shown in FIG. 2, the turbine controller 26 is disposed within a control cabinet mounted to a portion of the nacelle 16. However, it should be appreciated that the turbine controller 26 may be disposed at any location on or in the wind turbine 10, at any location on the support surface 14 or generally at any other location. In general, the turbine controller 26 may be configured to transmit and execute wind turbine control signals and/or commands in order to control the various operating modes (e.g., start-up or shut-down sequences) and/or components of the wind turbine 10.

Referring now to FIG. 2, a simplified, internal view of a nacelle 16 of the wind turbine 10 according to conventional construction is illustrated. As shown, the generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox assembly 36. As is generally understood, the rotor shaft 32 may provide a low speed, high torque input to the gearbox assembly 36 in response to rotation of the rotor blades 22 and the hub 20. The gearbox assembly 36 may then be configured to convert the low speed, high torque input to a high speed, low torque output to drive the generator shaft 34 and, thus, the generator 24. In alternative embodiments, the rotor shaft 32 may be eliminated and the rotatable hub 20 may be configured to turn the gears of the gearbox assembly 36, rather than requiring a separate rotor shaft 32.

Referring now to FIG. 3, a cross-sectional view of a gearbox assembly 36 according to conventional construction is illustrated. As shown, the gearbox assembly 36 includes planetary gear system 38 housed within a gearbox housing 37. More specifically, the gear system 38 includes a plurality of gears (e.g., planetary, ring, sun, helical, and/or spur gears) and bearings 39 for converting the low speed, high torque input of the rotor shaft 32 to a high speed, low torque output for the generator 24. For example, as shown, the input shaft 32 may provide an input load to the gear system 38 and the system 38 may provide an output load to the generator 24 (FIG. 2) as is generally known in the art. Thus, during operation, input load at an input rotational speed is transmitted through the planetary gear system 38 and provided as output load at output rotational speed to the generator 24.

Further, the planetary gear system 38 includes a first planetary carrier 40 and a second planetary carrier 42 operatively coupling a plurality of gears. Further, as shown, the planetary gear system 38 includes, at least, a ring gear 41, one or more planet gears 44, a sun gear 46, one or more first pin shafts 43, and one or more second pin shafts 45. For example, in several embodiments, the gear system 38 may include one, two, three, four, five, six, seven, eight, or more planet gears 44. Further, each of the gears 41, 44, 46 includes a plurality of teeth. The teeth are sized and shaped to mesh together such that the various gears 41, 44, 46 engage each other. For example, the ring gear 41 and the sun gear 46 may each engage the planet gears 44. In addition, it should be understood that the gears 41, 44, 46 described herein may include any suitable type of gears, including but not limited to spur gears, face gears, helical gears, double helical gears, or similar.

In some embodiments, one or both of the planetary carriers 40, 42 may be stationary. In these embodiments, the input shaft 32 may be coupled to the ring gear 41, and input loads on the input shaft 32 may be transmitted through the ring gear 41 to the planet gears 44. Thus, the ring gear 41 may drive the gear system 38. In other embodiments, the ring gear 41 may be stationary. In these embodiments, the input shaft 32 may be coupled to the planetary carriers 40, 42, and input loads on the input shaft 32 may be transmitted through the planetary carriers 40, 42 to the planet gears 44. Thus, the planetary carriers 40, 42 may drive the gear system 38. In still further embodiments, any other suitable component, such as the planet gear 44 or the sun gear 46, may drive the gear system 38.

Still referring to FIG. 3, the sun gear 46 defines a central axis 49, and thus rotates about this central axis 49. The ring gear 41 may at least partially surround the sun gear 46, and be positioned along the central axis 49. Further, the ring gear 41 may (if rotatable) thus rotate about the central axis 49. Each of the planet gears 44 may be disposed between the sun gear 46 and the ring gear 41, and may engage both the sun gear 46 and the ring gear 41. For example, the teeth of the gears may mesh together, as discussed above. Further, each of the planet gears 44 may define a central planet axis 48, as shown. Thus, each planet gear 44 may rotate about its central planet axis 48. Additionally, the planet gears 44 and central planet axes 48 thereof may rotate about the central axis 49.

The gearbox assembly 36 may also include a lubrication system or other means for circulating oil throughout the gearbox components. For example, as shown in FIG. 3, the gearbox assembly 36 may include a plurality of oil passages 47 that are configured to transfer oil therethrough. As is generally understood, the oil may be used to reduce friction between the moving components of the gearbox assembly 36 and may also be utilized to provide cooling for such components, thereby decreasing component wear and other losses within the gearbox assembly 36 and increasing the lifespan thereof. In addition, the oil may contain properties that prevent corrosion of the internal gearbox components.

Referring now to FIG. 4, a cross-sectional view of a gearbox assembly 136 according to the present disclosure is illustrated. As shown, the gearbox assembly 136 includes planetary gear system 138 housed within a gearbox housing 137. More specifically, the gear system 138 includes a plurality of gears (e.g., planetary, ring and/or sun gears) and bearings 139 for converting the low speed, high torque input of the rotor shaft 132 to a high speed, low torque output for the generator (not shown). For example, as shown, the input shaft 132 may provide an input load to the gear system 138 and the system 138 may provide an output load to the generator via output shaft 134. Thus, during operation, input load at an input rotational speed is transmitted through the planetary gear system 138 and provided as output load at output rotational speed to the generator.

Further, as shown, the planetary gear system 138 includes a first planetary carrier 140 and a second planetary carrier 142 operatively coupling a plurality of gears. It should also be understood that the planetary gear system 138 may have any suitable arrangement of planetary stages and/or helical stages. In the depicted embodiment, which is provided for illustrated purposes only, the planetary gear system 138 includes, at least, a ring gear 141, one or more planet gears 144, a sun gear 146, one or more first pin shafts 143, and one or more second pin shafts 145. For example, in several embodiments, the gear system 138 may include one, two, three, four, five, six, seven, eight, or more planet gears 144. Further, each of the gears 141, 144, 146 includes a plurality of teeth. The teeth are sized and shaped to mesh together such that the various gears 141, 144, 146 engage each other. For example, the ring gear 141 and the sun gear 146 may each engage the planet gears 144. In addition, as mentioned, it should be understood that the gears 141, 144, 146 described herein may include any suitable type of gears, including but not limited to spur gears, face gears, helical gears, double helical gears, or similar.

In some embodiments, the planetary carriers 140, 142 may be stationary. In these embodiments, the input shaft 132 may be coupled to the ring gear 141, and input loads on the input shaft 132 may be transmitted through the ring gear 141 to the planet gears 144. Thus, the ring gear 141 may drive the gear system 138. In other embodiments, the ring gear 141 may be stationary. In these embodiments, the input shaft 132 may be coupled to the planetary carriers 140, 142, and input loads on the input shaft 132 may be transmitted through the planetary carriers 140, 142 to the planet gears 144.

Still referring to FIG. 4, the sun gear 146 defines a central axis 149, and thus rotates about this central axis 149. The ring gear 141 may at least partially surround the sun gear 146, and be positioned along the central axis 149. For example, the ring gear 141 may be aligned with the sun gear 146 along the central axis 149, or may be offset from the sun gear 146 along the axis 149. The ring gear 141 may (if rotatable) thus rotate about the central axis 149. Each of the planet gears 144 may be disposed between the sun gear 146 and the ring gear 141, and may engage both the sun gear 146 and the ring gear 141. In addition, as shown generally in FIGS. 4-18, the pin shaft(s) 143, 145 and/or the planetary carrier(s) 140, 142 of the present disclosure may include one or more voids 152 formed therein so as to increase flexibility thereof, which improves the load distribution of the planetary carrier 140, 142. Thus, as shown, the pin shaft(s) 143, 145 may include a variable cross-section as opposed to a constant cross-section of prior art pin shafts.

Referring now to FIGS. 4-6, the pin shaft(s) 143, 145 of the present disclosure may be formed integrally with the planetary carrier 140, 142, respectively, (i.e. in contrast to conventional gearboxes as shown in FIG. 3 where the pin shaft(s) 43, 45 are separate from the planetary carrier(s) 40, 42). In other words, in one embodiment, the pin shaft(s) 143, 145 and the planetary carrier 140, 142 may be a formed as a single part. For example, in one embodiment, the pin shaft(s) 143, 145 may be formed integrally with the planetary carrier 140, 142 via an additive manufacturing process. As used herein, additive manufacturing generally refers to processes used to create a three-dimensional object in which layers of material are formed under computer control to create an object. More specifically, the additive manufacturing processes described herein may include binder jetting, material jetting, laser cladding, cold spray deposition, directed energy deposition, powder bed fusion, material extrusion, vat photopolymerisation, or any other suitable additive manufacturing process. In one exemplary embodiment, the pin shaft(s) 143, 145 may be formed integrally with the planetary carrier 140 via sand binder jetting that utilizes ductile iron or carbon steel.

In alternative embodiments, the pin shaft(s) 143, 145 may be formed integrally with the planetary carrier 140, 142 via casting the pin shaft(s) 143, 145 and the planetary carrier(s) 140, 142 (e.g. the first stage planetary carrier 140 with a plurality of first stage pin shafts 142) into a single mold. In such embodiments, casting of the planetary carrier 140, 142 and the pin shaft(s) 143, 145 may include pouring a liquid material into a mold of the planetary carrier 140, 142 and the pin shaft(s) 143, 145 and allowing the liquid material to solidify in the mold so as to form the planetary carrier 140, 142 and the pin shaft(s) 143, 145 as the single part. Alternatively, the planetary carrier 140, 142 and the pin shaft(s) 143, 145 may be formed by pouring a liquid material into a mold of the planetary carrier 140, 142, allowing the liquid material to solidify in the mold so as to form the planetary carrier 140, 142, and then additively molding or printing the pin shaft(s) 143, 145 to the cast carrier 140, 142 to form the integral part.

In addition, as shown in FIGS. 15 and 16, the planetary carrier(s) 140, 142 may be split into a main portion 151 and a secondary portion 153 along split line 147 after it is formed to assist with assembly of the gears onto the pin shaft(s) 143, 145. Further, as shown, the main portion 151 of the planetary carrier(s) 140, 142 may include the pin shaft(s) 143, 145. As such, after splitting, the secondary portion 153 of the planetary carrier(s) 140, 142 from the main portion 151 such that the gears (not shown) can be assembled onto the pin shafts. The secondary portion 153 can then be secured to the main portion 151, e.g. via one or more fasteners.

Once the integral pin shaft(s) 143, 145 and planetary carrier(s) 140, 142 is formed (or just the pin shaft(s) 143, 145), further additive manufacturing techniques may be used to create the variable cross-section into the pin shaft(s) 143, 145. For example, as shown in FIGS. 4-9, an additive manufacturing process (e.g. such as sand binder jetting or lost wax casting methods) may be used to create the void(s) 152 into the pin shaft(s) 143 and/or the carrier(s) 140, 142. As such, the variable cross-section of the pin shaft(s) 143, 145 is configured to increase flexibility of the pin shaft(s) 143, 145 so as to improve a load distribution of the planetary carrier 140, 142. More specifically, as shown in FIGS. 4-10, the void(s) 152 may have a round, conical shape that tapers from a first end 154 to a second end 156 of the pin shaft(s) 143. Further, as shown particularly in FIG. 10, the flexible pin shafts 143, 145 allow for the possibility to provide directional deformation (as represented by the arrows) that helps to improve the load distribution on the gears 144, the carrier back-wall 157, and/or on the bearings (not shown). As used herein, the term "variable cross-section" generally refers to any suitably shaped cross-section that is non-uniform and/or non-constant over the length of the pin shaft(s) 143.

In alternative embodiments, as shown in FIG. 11, the void(s) 152 may have a non-conical shape. For example, as shown, the void(s) 152 may be thicker at the first and second ends 154, 156 and thinner in the middle. In addition, as shown in FIG. 12, it should be further understood that the void(s) 152 may have any suitable shape that may be adjusted to match the desired local stiffness. For example, as shown, FIG. 12 illustrates three different cross-sections of a single representative pin shaft 143 along the longitudinal axis of the pin shaft 143. Thus, as shown, the cross-section of the pin shaft 143 (and more specifically the void 152) can be varied (e.g. rotated) axially to facilitate low stresses along the load path. Accordingly, as shown, the cross-section of the void 152 of the pin shaft 143 may have a different shape along the axis to match the desired corresponding stiffness.

In additional embodiments, the location(s) for the void(s) 152 may be determined based on a load path of the planetary carrier(s) 140, 142. For example, in one embodiment, the void(s) 152 may be formed in the pin shaft(s) 143, 145 in a lengthwise center location thereof so as to move the load path closer to the center of the pin shaft(s) 143, 145. More specifically, as shown in FIGS. 4-14, the voids(s) 152 taper towards the lengthwise center of the pin shaft(s) 143, 145 to maintain the stresses in the pin shaft(s) 143, 145 and the planetary carrier(s) 140, 142 within acceptable limits while yielding deformation that creates a desired load pattern in the gears.

Referring particularly to FIGS. 13 and 14, at least one additional feature 160 may also be formed or printed into the pin shaft(s) 143 via additive manufacturing. More specifically, in certain embodiments, the additional feature 160 may include an oil path (e.g. an oil supply path, an oil drain (removal) path, an oil distribution manifold, an oil collection channel, an oil buffer, and/or similar), one or more ribs or structural supports on and interior surface of one or more of the voids, a cooling channel, an inspection path, a void removal feature, a signal wiring path, one or more recesses, or a locating feature, or any other features that can be easily printed or formed therein.

For example, as shown in FIGS. 9 and 17-18, one or more oil paths 158 may also be formed through the pin shaft(s) 143. More specifically, as shown particularly in FIG. 9, an oil path 158 may be formed from an exterior surface 155 of the pin shaft(s) 143 at the first end 154 thereof and through one of the voids 152 to the second end 156 of the pin shaft(s) 143. In another embodiment, as shown in FIG. 17, the oil path 158 may be completely separate from the voids 152. In further embodiments, any number of oil paths may be formed into the pin shaft(s) 143, 145 via any suitable additive manufacturing process.

In additional embodiments, as shown in FIG. 13, the additional feature(s) 160 may also include a cooling channel 162. Further, as shown in FIGS. 17 and 18, the additional feature(s) 160 may include one or more ribs 165 or structural supports on and interior surface of one or more of the voids 152. Such ribs 165 are configured to locally increase stiffness where desired.

In addition, as shown in FIG. 14, the additional feature(s) 160 may include a signal wiring path 164 and/or a sensor recess 166 configured to receive a sensor or probe. Thus, as shown, a sensor wire and associated sensor can be positioned in the pin shaft(s) 143. Further, as shown in FIG. 18, the additional feature(s) 160 may include an inspection path or probe recess configured to receive a proximity sensor (e.g. an inductive, infrared or ultrasonic sensor) that can take measurements of the curves at the end of the void(s) 152 opposite the planetary carrier(s) 140, 142 as well as measuring pin deflection.

In further embodiments, the additional feature(s) 160 may include a locating feature 168. For example, as shown in FIGS. 5-6 and 13-14, the locating features 168 may be flanges that assist in aligning the pin shaft(s) 143, 145 with the planetary carrier(s) 140, 142. It should be understood that the additional feature(s) 160 may further include any other features that can be easily printed or formed therein.

In yet another embodiment, the additional feature(s) 160 may include void removal feature 169. For example, as shown in FIG. 18, one or more of the voids 152 may be created to facilitate removal of sand binder jet cores used to cast the internal pin geometry. Such voids 152 are referred to herein as void removal features 169. In addition, the pin shaft 142 may include additional number of additional recesses, such as recess 174, configured to receive at least a portion of a bearing, such as a journal or roller bearing frame. Further, as shown, the recess(es) 174 may be designed to receive a retaining ring of a bearing.

Referring particularly to FIG. 13, the gearbox assembly 136 may further include at least one seal 170 arranged on the exterior surface 155 of the pin shaft(s) 143 so as to seal the one or more voids 152. In such embodiments, the seal(s) 170 are configured to allow the voids 152 to be multi-functional, e.g. to create a lubricant supply or drain, to facilitate cleaning, and/or to prevent dirt out once cleaned, e.g. during machining or during operation.

Referring now to FIG. 19, a flow diagram of one embodiment of a method 100 for manufacturing the planetary carrier 140 and the pin shaft(s) 143 of the gearbox assembly 136 of the wind turbine 10 is illustrated. As shown at 102, the method 100 includes forming the planetary carrier(s) 140, 142. As shown at 104, the method 100 includes forming the pin shaft(s) 143, 145. For example, as shown in FIGS. 7 and 8, the planetary carrier(s) 140, 142, and/or the pin shaft(s) 143, 145 may be formed via casting the components as separate parts. It should be understood that any suitable casting technique may be used, including but not limited to, centrifugal casting, core plug casting, die casting, glass casting, investment casting, lost-foam casting, lost-wax casting, molding, permanent mold casting, rapid casting, sand casting, and/or slip-casting, etc.

As shown at 106, the method 100 includes forming one or more voids 152 in the pin shaft(s) 143, 145 to create a variable cross-section of the pin shaft(s) 143, 145 via additive manufacturing. As such, the variable cross-section of the pin shaft(s) 143, 145 is configured to increase flexibility of the pin shaft(s) 143, 145 so as to improve a load distribution of the planetary carrier 140, 142.

As shown at 108, the method 100 includes securing the pin shaft(s) 143, 145 to the planetary carrier(s) 140, 142, respectively. More specifically, as shown in FIGS. 7, 9, 11, and 13-14, the method 100 may include securing the pin shaft(s) 143, 145 to the planetary carrier(s) 140, 142 via one or more fasteners 174.

In further embodiments, as shown FIGS. 13 and 14, the pin shaft(s) 143 may further include bearing material 172 disposed onto the exterior surface 155 thereof. For example, in one embodiment, the method 100 may include printing the bearing material 172 onto the exterior surface 155 of the pin shaft(s) 143 layer by layer, e.g. so as to build up a journal bearing thereon. As such, the method 100 creates an adhesion or metallurgical bond between the pin shaft(s) 143 and the bearing material 172. Thus, the bond replaces conventional fasteners of prior art systems and eliminates interference stresses, thereby enabling a smaller space envelope. In addition, the method 100 requires less material/weight and reduces machining and assembly time for the journal bearing.

More specifically, in certain embodiments, the bearing material 172 may include various metals or metal alloys, including, for example, a copper alloy (e.g. bronze). Thus, the bearing material 172 may be applied to the exterior surface 155 of the pin shaft(s) 143 to provide improved wear characteristics under loading (especially at startup and shutdown, when an oil film may be insufficient to separate the rotating and non-rotating surfaces). In addition, as shown, the method 100 may further include completely or partially covering the exterior surface 155, thereby optionally covering the one or more fasteners 174 with the deposited bearing material 172. Accordingly, by printing the bearing material 172, said material can be thinner than conventional bearings (e.g. about 2 millimeters (mm) as opposed to 15 mm).

In certain embodiments, the bearing material 172 may be printed via a programmed robotic system capable of printing the bearing material 172 that enables additional productivity benefits and repeatability relative to a manual process. Traditionally, to harden the surface of the bearing, the entire journal would need to be heat treated. Hardening of the bearing is only needed on the surface and can be accomplished with concentrated/amplified light energy. As such, the method 100 of the present disclosure improves speed and automation of the process and provides optimal material properties only where desired.

Referring now to FIG. 20, a flow chart of one embodiment of a method 200 for manufacturing a gear assembly of a gearbox of a wind turbine according to the present disclosure is illustrated. In general, the method 200 described herein generally applies to the wind turbine 10 described above. However, it should be appreciated that the disclosed method 200 may be implemented using any other suitable wind turbine and/or gear assemblies. Although FIG. 20 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown 202, the method 200 includes forming a carrier 140 of the gear assembly. It should be understood that the carrier 140 may be formed using any suitable method as described herein. As shown at 204, the method 200 includes additively molding or printing at least a portion of at least one pin shaft 143, 145 of the gear assembly onto the carrier 140 to form an integral part. As shown at 206, the method 200 includes forming one or more voids 152 in the pin shaft(s) 143, 145 of the gear assembly via an additive manufacturing process, such as any of the additive manufacturing processes described herein. More specifically, as shown in FIG. 23B-25, the voids 152 in the pin shaft(s) 143, 145 may define one or more oil paths 176 within the pin shaft(s) 143, 145. As such, the void(s) 152 (e.g. the oil path(s) 176) are configured to improve cooling of the gear assembly.

For example, as shown in FIGS. 23A-23C, multiple cross-sectional views of the pin shaft(s) 143, 145 formed via additive manufacturing according to the present disclosure are illustrated, particularly depicting a two-dimensional description of the heating and cooling of the pin shaft(s) 143, 145 during operation. FIG. 23A illustrates a cross-sectional view of a baseline pin shaft 43 according to conventional construction without any oil paths provided therein. Therefore, as shown, the pin shaft(s) 43 is cooled via external oil 188 only (i.e. on the left side of the pin 143). FIG. 23B illustrates a cross-sectional view of one embodiment of the pin shaft 143 according to the present disclosure, with a circular oil path 176 on the same side of the pin shaft 143 experiencing the heating by friction due to the load path, thereby providing improved cooling. FIG. 23C illustrates a cross-sectional view of one embodiment of the pin shaft 143 according to the present disclosure, with a plurality of oval oil paths 176, also on the same side of the pin shaft 143 experiencing the heating by friction due to the load path, thereby providing improved cooling. FIGS. 23B-23C are provided as example embodiments and are not meant to be limiting. Still further embodiments can included additional configurations of the cooling oil path 176 described herein according to the present disclosure.

In particular embodiments, as shown in FIG. 24, the oil path(s) 176 may extend parallel to a longitudinal axis of the pin shaft(s) 143, 145.

In further embodiments, the method 200 may also include determining a geometry and/or location for the oil path(s) 176 based on a load path of the gear assembly and forming the oil path(s) 176 in the pin shaft(s) 143, 145 based on the load path. For example, as shown in FIGS. 21 and 22, a load path is illustrated via arrows 184, 186. Thus, as shown, as the load 184 acts on the gear 144 and its associated bearing 172 revolving thereon, the pin shaft 143 is pushed in the opposite direction, as shown via arrow 186. Therefore, the loads 184, 186 acting on the pin shaft 143 are more or less fixed relative to the shaft 143. In such instances, cooling of the pin shaft 143 may be impaired. Thus, the oil path(s) 176 described herein can be provided in the pin shaft(s) 143, 145 such that the path(s) 176 cool the portion of the shaft(s) 143, 145 that are heated the most due to the load. For example, as shown in FIG. 23B-25, the method 200 may further include forming a plurality of the oil paths 176 adjacent to an outer surface 182 of the pin shaft(s) 143, 145 such that the plurality of oil paths 176 are positioned on a side of the pin shaft(s) 143, 145 corresponding to where a load is acting during operation of the gear assembly.

For example, in an embodiment, positioning the plurality of oil paths 176 within the pin shaft(s) 143, 145 corresponding to where a load is acting during operation of the gear assembly simply means that the oil paths should be placed close to that surface. In other words, the distance between the heated bearing surface and the cooling surface should be as small as possible, e.g. without comprising the integrity of the pin shaft(s) 143, 145.

Referring particularly to FIG. 24, the oil path(s) 176 may also have at least one oil inlet 178 and at least one oil outlet 180. For example, as shown in the illustrated, the oil path(s) 176 has four oil outlets 180. In additional embodiments, the oil path(s) 176 may include more than four or less than four oil outlets 180. In addition, as shown in FIGS. 23B-25, the oil outlet(s) 180 may be positioned at the outer surface 182 of the pin shaft(s) 143, 145 so as to provide a lubricant, such as oil, to the bearing/bearing material 172 mounted or otherwise secured circumferentially around the pin shaft(s) 143, 145. In alternative embodiments, the oil outlet(s) 180 may be positioned so as to provide a lubricant, such as oil, from the oil path(s) 176 to a gear, an axial bearing, a roller bearing or a sump.

In additional embodiments, the oil path(s) 176 described herein may have any suitable cross-sectional shape. As such, the oil path(s) 176 can benefit from surface irregularities that extend from the surface, which is easy to accomplish via additive manufacturing. For example, as shown in FIG. 26A, the oil path(s) 176 may have a circular cross-section. Alternatively, as shown in FIG. 26B-26D, the oil path(s) 176 may have a non-circular cross-section. More specifically, as shown in FIG. 26B, the non-circular cross-section may be an ellipse or oval.

Moreover, as shown in FIG. 26C, one or more of the oil path(s) 176 may have one or more ribs or protrusions 184 formed into an inner surface 186 thereof. In addition, as shown in FIG. 26C, one or more of the oil path(s) 176 may have one or more ribs or protrusions 184 added onto the inner surface 186 thereof (i.e. rather than formed into the surface 186), which does not give rise to stress concentrations. Such ribs/protrusions 184 can be provided to increase turbulence and/or to provide an effective cooling area for the load path due to heating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a gear assembly of a gearbox of a wind turbine, the method comprising:
    forming a carrier of the gear assembly;
    additively molding or printing at least a portion of at least one pin shaft of the gear assembly onto the carrier to form an integral part;
    identifying a portion of the shaft having an increased heating relative to at least an additional portion of the shaft during operation of the gear assembly; and
    forming one or more voids in the at least one pin shaft of the gear assembly adjacent to the portion of increased heating via an additive manufacturing process, the one or more voids configured to improve cooling of the gear assembly.

2. The method of claim 1, wherein the additive manufacturing process comprises at least one of binder jetting, material jetting, laser cladding, cold spray deposition, directed energy deposition, powder bed fusion, material extrusion, or vat photopolymerisation.

3. The method of claim 1, wherein forming the one or more voids in the at least one pin shaft further comprises forming one or more oil paths within the at least one pin shaft having at least one oil inlet and at least one oil outlet.

4. The method of claim 3, wherein the at least one oil outlet is positioned at an outer surface of the at least one pin shaft so as to provide a lubricant to a bearing mounted circumferentially around the at least one pin shaft.

5. The method of claim 3, wherein the at least one oil outlet is positioned so as to provide a lubricant from the one or more oil paths to a gear, an axial bearing, a roller bearing or a sump.

6. The method of claim 3, wherein identifying the portion of the shaft having the increased heating relative to at least another portion of the shaft further comprises identifying a load path of the gear assembly, wherein the increased heating is due to the load, the method further comprising:
    determining a geometry for the one or more oil paths based on the load path of the gear assembly.

7. The method of claim 1, further comprising forming a plurality of oil paths adjacent to an outer surface of the at least one pin shaft such that the plurality of oil paths are only positioned on a side of the at least one pin shaft corresponding to where a load is acting during operation of the gear assembly.

8. The method of claim 7, wherein the plurality of oil paths defines a circular cross-section.

9. The method of claim 7, wherein the plurality of oil paths defines a non-circular cross-section.

10. The method of claim 9, wherein the non-circular cross-sections define an ellipse.

11. The method of claim 7, wherein one or more of the plurality of oil paths comprise one or more ribs added onto the inner surface thereof, the plurality of oil paths having an absence of stress concentrations due to the addition of the one or more ribs.

12. The method of claim 1, wherein forming the one or more voids in the at least one pin shaft further comprises forming the one or more oil paths such that the one or more oil paths extend parallel or tangential to a longitudinal axis of the at least one pin shaft, the one or more oil paths being located within the at least one pin shaft where a load is acting during operation of the gear assembly.

13. The method of claim 1, further comprising forming the carrier via at least one of additive manufacturing, forging or casting.

14. A gear assembly, comprising:
at least one pin shaft comprising one or more voids formed therein via an additive manufacturing process, the one or more voids being positioned adjacent to a portion of the shaft having an increased heating relative to at least an additional portion of the shaft during operation of the gear assembly and configured to improve cooling of the gear assembly,
a gear arranged circumferentially around the at least one pin shaft; and,
at least one carrier operatively coupled with the at least one gear.

15. The gear assembly of claim 14, wherein the one or more voids define one or more oil paths adjacent to an outer surface of the at least one pin shaft such that the one or more oil paths are positioned only on a side of the at least one pin shaft corresponding to where a load is acting during operation of the gear assembly.

16. A method for manufacturing a gear assembly of a gearbox of a wind turbine, the method comprising:
forming a carrier of the gear assembly;
forming at least one pin shaft of the gear assembly via an additive manufacturing process;
identifying a portion of the shaft having an increased heating relative to at least an additional portion of the shaft during operation of the gear assembly;
forming one or more voids in the at least one pin shaft of the gear assembly adjacent to the portion of increased heating via an additive manufacturing process, the one or more voids configured to improve cooling of the gear assembly; and
securing the at least one pin shaft to the carrier.

17. The method of claim 16, wherein the additive manufacturing process comprises at least one of binder jetting, material jetting, laser cladding, cold spray deposition, directed energy deposition, powder bed fusion, material extrusion, or vat photopolymerisation.

18. The method of claim 16, wherein forming the one or more voids in the at least one pin shaft further comprises forming one or more oil paths within the at least one pin shaft having at least one oil inlet and at least one oil outlet.

19. The method of claim 18, wherein identifying the portion of the shaft having the increased heating relative to at least another portion of the shaft further comprises identifying a load path of the gear assembly, wherein the increased heating is due to the load, the method further comprising:
determining a geometry for the one or more oil paths based on the load path of the gear assembly; and
adding onto the one or more oil paths one or more ribs on an inner surface thereof so as to provide an effective cooling area for the load path.

20. The method of claim 16, further comprising forming a plurality of oil paths adjacent to an outer surface of the at least one pin shaft such that the plurality of oil paths is positioned only on a side of the at least one pin shaft corresponding to where a load is acting during operation of the gear assembly.

* * * * *